United States Patent [19]
Manos

[11] Patent Number: 5,884,283
[45] Date of Patent: Mar. 16, 1999

[54] SYSTEM, METHOD AND PROGRAM PRODUCT FOR MANAGING AND CONTROLLING THE DISPOSITION OF FINANCIAL RESOURCES

[76] Inventor: Christopher T. Manos, 103 Ramey Ave., Pittsburgh, Pa. 15220

[21] Appl. No.: 708,465

[22] Filed: Sep. 5, 1996

[51] Int. Cl.[6] ....................................................... G06F 19/00
[52] U.S. Cl. ................................. 705/30; 705/4; 705/30; 705/35; 705/36; 705/37; 705/40; 1/1
[58] Field of Search ................................... 705/4, 30, 35, 705/36, 40, 37; 1/1

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. . |
| 4,700,297 | 10/1987 | Hagel, Sr. et al. . |
| 4,774,663 | 9/1988 | Musmanno et al. . |
| 4,774,664 | 9/1988 | Campbell et al. . |
| 5,237,500 | 8/1993 | Perg et al. ............................. 705/35.37 |
| 5,270,922 | 12/1993 | Higgins . |
| 5,297,031 | 3/1994 | Gutterman et al. . |
| 5,297,032 | 3/1994 | Trojan et al. . |
| 5,590,037 | 12/1996 | Ryam et al. .............................. 705/4.3 |
| 5,644,727 | 7/1997 | Atkins ........................................ 705/40 |
| 5,742,775 | 4/1998 | Klng ................................................. 1/1 |

OTHER PUBLICATIONS

Statistical Abstract Of The United States 1988, 108th Edition U. S. Department Of Commerce, Bureau Of The Census, p. 410.

Primary Examiner—Allen R. MacDonald
Assistant Examiner—M. Irshadullah
Attorney, Agent, or Firm—Andrew J. Cornelius

[57] ABSTRACT

A method, computer program product and system providing management and control of the disposition of personal financial resources, taking into account the effects of inflation and deflation. The method is used to project target gross income, income taxes, after-tax income, living costs and savings over a period of time. The compounding effect of inflation (deflation) is applied to actual amounts for gross income, income taxes, after-tax income, living costs and savings to project targets for these amounts through the projected period by applying to the actual amounts the estimated rate of inflation or deflation and rates that are related to these rates. Actual inflation and deflation rates are used to determine and recalculate the inflation and deflation rates, and the rates that are related to those rates, and the recalculated rates are applied to the actual amounts to recalculate the targeted amounts. Variances between targeted amounts and actual amounts, which are calculated as actual figures are determined during the projected period, are produced.

13 Claims, 10 Drawing Sheets

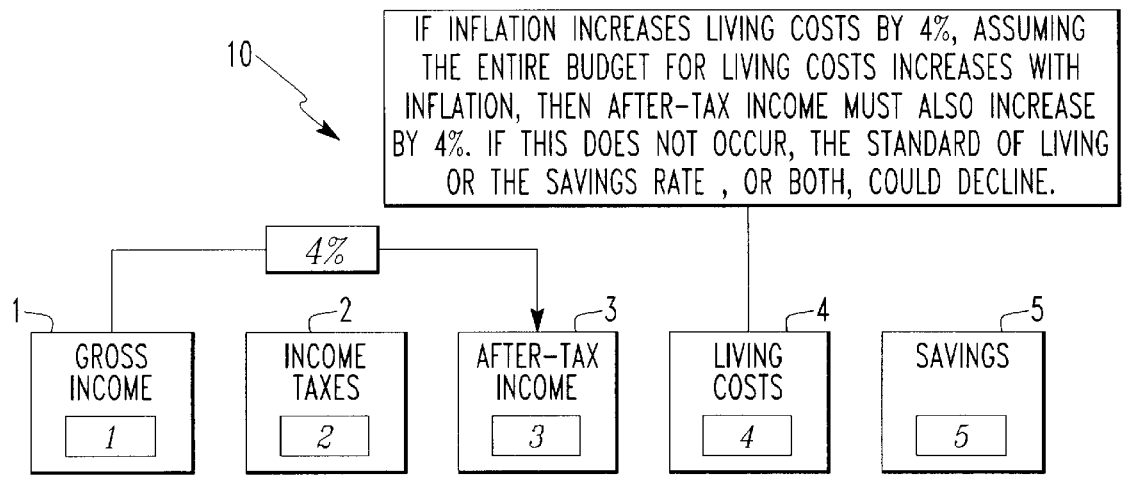
FIG. 4
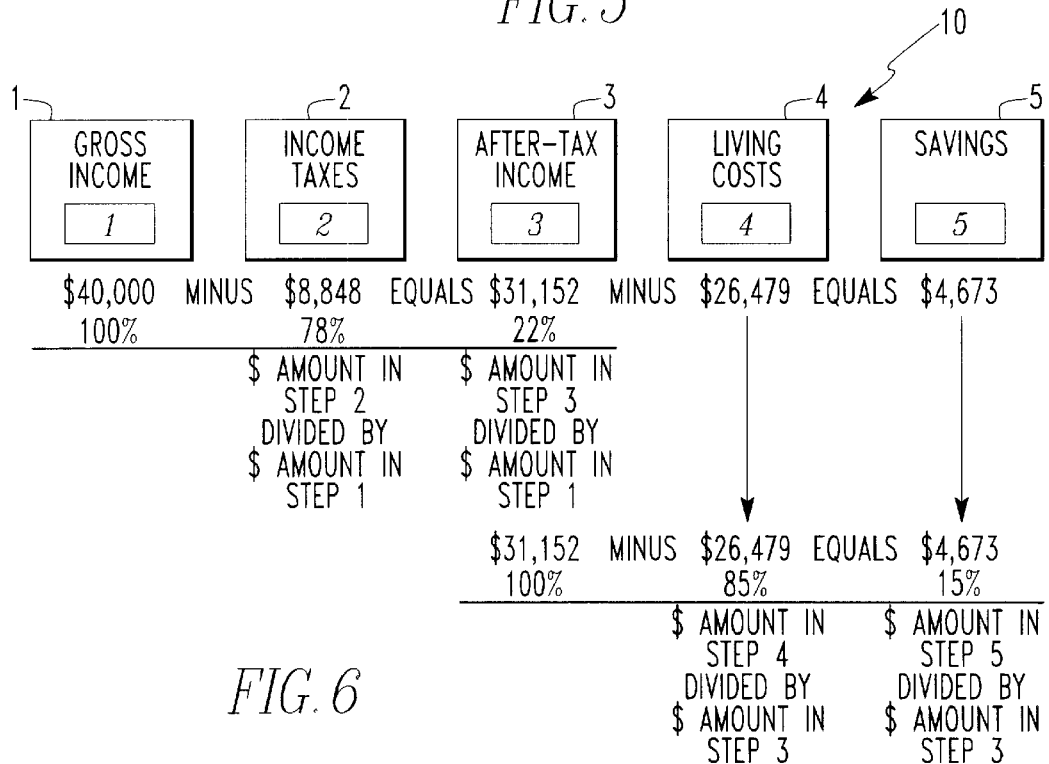
FIG. 5
FIG. 6

SYSTEM, METHOD AND PROGRAM PRODUCT FOR MANAGING AND CONTROLLING THE DISPOSITION OF FINANCIAL RESOURCES

BACKGROUND OF THE INVENTION

The present invention relates to financial control and management, and, more particularly, to a system, a method and a computer program product for managing and controlling the disposition of financial resources.

While many individuals employ techniques of one form or another to try to manage their personal finances, they often fail as a result of their ignorance of the effects of inflation on their financial situation. In particular, inflation has a compounding effect on living costs, a fact that is not widely appreciated, and that has a significant effect on personal financial planning.

The compounding process, which is a mathematical operation based on the laws of multiplication, has been referred to as the eighth wonder of the world. This is a result of its ability to greatly magnify (increase) whatever is being compounded over time.

Despite the best attempts to describe with clarity the power of compounding, it still remains a mystery to many. While most are familiar with how investment return compounds, few have come to understand that living costs as measured by inflation increase at a compound rate. The same mathematical operation that increases investment return—which is compounding—increases living costs. This effect complicates the financial planning process.

TABLE 1

Compounding Inflation During 1949–1994

| A Year | B Inflation Rates | C Conversion Factor | D Index Value | Approximate Time of Doubling |
|---|---|---|---|---|
| | | | 100.00 | |
| 1949 | −2.10 | .979 | 97.90 | |
| 1950 | 5.90 | 1.059 | 103.68 | |
| 1951 | 6.00 | 1.06 | 109.90 | |
| 1952 | 0.80 | 1.008 | 110.78 | |
| 1953 | 0.70 | 1.007 | 111.56 | |
| 1954 | −0.70 | .993 | 110.78 | |
| 1955 | 0.40 | 1.004 | 111.22 | |
| 1956 | 3.00 | 1.03 | 114.56 | |
| 1957 | 2.90 | 1.029 | 117.88 | |
| 1958 | 1.80 | 1.018 | 120.00 | |
| 1959 | 1.70 | 1.017 | 122.04 | |
| 1960 | 1.40 | 1.014 | 123.75 | |
| 1961 | 0.70 | 1.007 | 124.62 | |
| 1962 | 1.30 | 1.013 | 126.24 | |
| 1963 | 1.60 | 1.016 | 128.26 | |
| 1964 | 1.00 | 1.01 | 129.54 | |
| 1965 | 1.90 | 1.019 | 132.00 | |
| 1966 | 3.50 | 1.035 | 136.62 | |
| 1967 | 3.00 | 1.03 | 140.72 | |
| 1968 | 4.70 | 1.047 | 147.33 | |
| 1969 | 6.20 | 1.062 | 156.46 | |
| 1970 | 5.60 | 1.056 | 165.22 | |
| 1971 | 3.30 | 1.033 | 170.67 | |
| 1972 | 3.40 | 1.034 | 176.47 | |
| 1973 | 8.70 | 1.087 | 191.82 | |
| 1974 | 12.30 | 1.123 | 215.41 | First Doubling |
| 1975 | 6.90 | 1.069 | 230.27 | |
| 1976 | 4.90 | 1.049 | 241.55 | |
| 1977 | 6.70 | 1.067 | 257.73 | |
| 1978 | 9.00 | 1.09 | 280.93 | |
| 1979 | 13.30 | 1.133 | 318.29 | |
| 1980 | 12.50 | 1.125 | 358.08 | |
| 1981 | 8.90 | 1.089 | 389.95 | |

TABLE 1-continued

Compounding Inflation During 1949–1994

| A Year | B Inflation Rates | C Conversion Factor | D Index Value | Approximate Time of Doubling |
|---|---|---|---|---|
| 1982 | 3.80 | 1.038 | 404.77 | Second Doubling |
| 1983 | 3.80 | 1.038 | 420.15 | |
| 1984 | 3.90 | 1.039 | 436.54 | |
| 1985 | 3.80 | 1.038 | 453.13 | |
| 1986 | 1.10 | 1.011 | 458.11 | |
| 1987 | 4.40 | 1.044 | 478.27 | |
| 1988 | 4.40 | 1.044 | 499.31 | |
| 1989 | 4.60 | 1.046 | 522.28 | |
| 1990 | 6.10 | 1.061 | 554.14 | |
| 1991 | 3.10 | 1.031 | 571.32 | |
| 1992 | 2.90 | 1.029 | 587.89 | |
| 1993 | 2.70 | 1.027 | 603.76 | |
| 1994 | 2.70 | 1.027 | 620.06 | |
| TOTAL | 188.50 | | | |

Table 1 lists the annual rates inflation for the period 1949 through 1994. The year 1949 was chosen as the beginning year in the study, since prior to 1949, excluding the eight year period 1941 through 1948, inflation was basically non-existent in the United States on a continuing basis, and typically occurred only during war-time periods. The eight year period from 1941 through 1948 was excluded, since it contains the five year period 1941 through 1945, representing the years of World War II—an inflationary period—and the three year period following World War II, 1946 through 1948. The three years from 1946 through 1948 can be characterized as a period when pent-up demand, which accumulated during the war years, was unleashed in the form of increased consumer spending—which generated inflation. Thus the eight year period from 1941 through 1948 was atypical regarding the rates of inflation that have been experienced in the United States. As a result, 1949 will be the beginning year for measuring increases in the price level.

Column A of Table 1 lists the years of the time period that is covered by this analysis—1949 through 1994. Column B shows the annual inflation rates for the time period. These rates are the annual rates of inflation as reported by the Department of Labor using the CPI-U (consumer price index reading for all urban consumers). Column C shows conversion factors that were calculated by dividing the annual inflation rate (or deflation rate) for each year in Column B by 100 and then adding the whole number 1 to the result. The formula for calculating the conversion factor is shown in equation Equation 1:

$$\text{Conversion Factor} = \frac{\text{Annual Inflation Rate}}{100} + 1$$

Changing the annual rates of inflation and deflation into conversion factors is necessary to apply the annual rates—by multiplication—to the CPI-U index value for each year that is shown in Column D. In Table 1, the CPI-U index value for each year is calculated by multiplying the CPI-U index value for the prior year by the conversion factor for the year for which the CPI-U index is being calculated. This is exactly how the price level is increased as measured by the CPI-U. That is, the price level for goods and services increases at a compound rate—by multiplication.

As is illustrated in Table 1, a first doubling took place in the average level of prices in 1974—the index value increased to 215.41—and a second doubling took place in 1982—the index value increased to 404.77 (Column D). The United States is now on its way to a third doubling when using 1949 as the base year for measuring compound increases in the average level of prices. It is important to note at this point that each time the price level doubles, the purchasing power of a dollar diminishes. Using 1949 as the point of reference, at the first doubling a 1949 dollar decreased in purchasing power to $0.50, at the second doubling it decreased to $0.25 and at the third doubling it will decrease to $0.125. It is important to note also that when the annual rates of inflation are added together each year during the period 1949 through 1994, the total is 188.50% (Column B). However the increase in the price level was not 188.50%, but rather 520.06% (comparing the ending 1994 index value of 620.06 to the beginning index value of 100—Column D). This is a result of the compounding process.

It is important to keep in mind that at the time of the first doubling, the index value increased from 100 to 200, at the time of the second doubling the index value increased from 200 to 400, at the time of the third doubling the index value will increase from 400 to 800, and at the time of the fourth doubling the index value will increase from 800 to 1600, and so on. In terms of dollars, what originally cost $1 would increase to $2, then to $4, then to $8, then to $16 and so on.

Table 2 shows the increases that take place in the average level of prices—represented by the index value—at the time of the first four doublings. Although only two doublings in the price level have occurred, when using 1949 as the beginning year, four doublings are shown. Significantly, when the sum of the annual rates of inflation total to 72 in any period, the price level (index value) doubles during that period—because the inflation rates are being applied multiplicatively as conversion factors. The number 72 is calculated by adding the inflation rates in Column B of Table 1. Each time a total of 72 is attained during a period of years in Column B, the index value in Column D doubles during that period. Note that 72 is an estimate for determining the time of each doubling. As a result the inflation rates may total slightly more than 72 before a doubling actually takes takes place in the index value (or price level).

TABLE 2

Time of Doublings

| Total Annual Inflation Rates | Number of Doublings | Index Value 100 | Total Percentage Change | Inflation Adjusted Dollars $1 |
|---|---|---|---|---|
| 72 | 1 | 200 | 100% | 2 |
| 72 | 2 | 400 | 300 | 4 |
| 72 | 3 | 800 | 700 | 8 |
| 72 | 4 | 1600 | 1500 | 16 |

*Accuracy of the number 72 is somewhat diminished by the prescence of deflation.

In summary, the major problem that is affecting the personal financial plans of those residing within the United States has been identified above. It is not the effect or component of inflation that increases by addition. Rather, it is the compounding component of inflation—that is, inflation that increases multiplicatively. Compounding inflation is not only driving up average living costs for goods and services as measured by the CPI-U, it is also driving up the cost of homes and college education. Just as investment returns increase at a compound rate, living costs, home costs and college costs do likewise, each compounding at their own specific rates of inflation.

This presents a serious problem that the typical American does not realize, let alone know how to address. In summary, annual inflation rates for living costs, homes or college do not increase additively—by addition—but multiplicatively—by multiplication. This process of multiplying the index value of the prior year by the inflation rate of the current year expressed as a conversion factor—which is mechanically how the price level increases—sets the compounding process in motion (see Column D of Table 1). Note that the cost of any item also increases in the same manner—that is, the prior year's cost is multiplied by the current year's inflation rate as a conversion factor. This would include the costs of homes, college education, cars and so on.

It is the compounding process that generates a snowballing increase in the price level. At each doubling, or 100% increase, the index value does not increase additively—from 100% to 200%, 200% to 300%, 300% to 400% and so on—but rather multiplicatively—from 100% to 200%, 200% to 400%, 400% to 800%, 800% to 1600% and so on.

FIG. 10 helps to clearly illustrate the need for this invention. As indicated in FIG. 10, between 1950 and 1994 median family incomes have risen from $3,319 to $38,782. However while incomes have been increasing, the value of the dollar has been depreciating—declining in purchasing power. In fact the purchasing power of a 1994 dollar, stated in terms of the purchasing power of a 1950 dollar, has declined to approximately 18 cents (having approximately ⅙ the purchasing power).

Therefore as incomes rise, purchasing power declines. This illustrates the problem of two economic forces moving in opposite directions and at different rates—yet affecting the same medium of exchange—which is the dollar. If inflation did not exist, we could remove from FIG. 10 the declining value of the dollar, as the prices of goods and services would be the same year in and year out. Rising incomes and a declining dollar present a confusing reality. People are earning more but their dollars are worth less. How does one couple together this economic dysfunction of rising incomes and declining purchasing power in order to accurately determine if they are ahead, behind or simply keeping pace with living costs? This invention unwinds and untangles this economic dysfunction of rising incomes coupled with a declining dollar (due to inflation) in order to provide an approach for inflation adjusting family income performance, living costs and savings. Let's take a closer look at the problem.

FIG. 11 illustrates the ranges of 1994 family incomes and is being used to provide a macro perspective of family earnings in the United States. As illustrated, in 1994 9% of all family incomes were under $10,000, 22% were between $10,000 and $24,999, 32% were between $25,000 and $49,999, 20% were between $50,000 and $74,999 and 17% were over $75,000. From here we will move to the FIG. 12 which illustrates median family incomes from 1950 to 1994 for selected time periods. (Note the term median denotes midpoint which is different from the average and family is defined as two or more persons residing together related by marriage, adoption or birth).

As illustrated in FIG. 12, in 1950 median family income in the United States was $3,319. By 1994 that figure increased to $38,782—an increase of 11.7 times. However while earnings were increasing, the purchasing power of the dollar was simultaneously decreasing—this being a result of inflation increasing living costs. In other words families were earning more but their dollars were buying less—an economic dysfunction.

According to the Consumer Price Index X1 (CPI-U X1), an accepted government index for restating current dollars to constant dollars (which differs from the CPI-U), from 1950 to 1994 the price level increased 5.66 times or 466%. Therefore what cost on average $1 in 1950 increased to approximately $5.66 in 1994. Stated another way, a 1994 dollar in terms of a 1950 dollar had about one sixth the purchasing power. Therefore when comparing the 1950 median family income figure of $3,319 to the 1994 figure of $38,782, one must first adjust for the fact that inflation is driving down the dollar's purchasing power. To accurately compare the numbers across time, either the figures in the chart must be restated in terms of the purchasing power of a 1994 dollar or the figures must be restated in terms of the purchasing power of a 1950 dollar.

Restating the 1994 figure of $38,782 in terms of a 1950 dollar's purchasing power yields $6,852 ($38,782 divided by 5.66, 5.66 representing the increase in the price level from 1950–1994). Comparing the inflation adjusted income figure of $6,852 to $3,319 yields an increase—after accounting for inflation—of approximately 106% during the period 1950–1994. Approaching the situation from the current level of prices (the 1994 price level), and restating the figures in FIG. 12 to the current level of prices (stated in terms of the purchasing power of a 1994 dollar) produces FIG. 13.

FIG. 13 begins with 1950 median family income of $18,774. Keep in mind all the figures in the chart have been restated to the current level of prices. Therefore the $18,774 median family income figure represents the amount of income needed in 1994 to buy the same amount of goods and services that $3,319 purchased in 1950 (1950 median family income of $3,319 multiplied by 5.66, the increase in the price level from 1950–1994 as measured by the CPI-U X1—the accepted government index for restating current dollars to constant dollars—in this example 1994 dollars). The other figures in FIG. 13, except the most recent figure which is 1994, are also inflation adjusted in the same manner—by taking the non inflation adjusted numbers in FIG. 12 and then increasing them by the rise in the price level—as reported by the CPI-U X1-using the comparative percentage change between each year in the chart and the year 1994 as the multiplier.

Once the figures are restated in 1994 dollars—the most recent year in FIG. 13—termed constant dollars—we can now accurately and correctly compare the numbers. As illustrated during the first 20 year period 1950–1970—median family incomes increased from $18,774 to $35,407, an increase of 89% after accounting for inflation—termed a real increase. During the next 24 year period incomes increased from $35,407 in 1970 to $38,782 in 1994, an increase of 10%. Therefore it is clear in FIG. 13 that during the first 20 years of the period 1950–1994, median family incomes increased significantly-almost doubled.

However during the next 24 year period, income performance began to slow considerably only increasing 10% over a 24 year period on an inflation adjusted basis. For the overall period 1950–1994 the increase is 106%, from $18,774 in 1950 to $38,782 in 1994. FIG. 13 is informing us that incomes have been increasing during both periods, however during the latter the increases in inflation were almost commensurate with that of family incomes. As a result families were unable to provide for improvements in their their standard of living, an increase in their savings rate or both.

It must be pointed out that inflation picked up during the last 24 years in FIG. 13, accelerating the decline in the purchasing power of the dollar (refer to FIG. 10—see decline in dollar's purchasing power). Further it is important to keep in mind that during the first 20 year period there was predominantly one wage earner while during the second period their has been an increase to two wage earners. As a result their is a definite need to understand inflation better, and to devise a method to measure its effects as it relates to personal financial planning. This has led to the development of this invention.

SUMMARY OF THE INVENTION

The present invention provides a system, a method and a computer program product for managing and controlling personal financial resources. Using the present invention, the individual can determine the levels of savings that are attainable based on their projected income, income taxes, after-tax income, living costs and savings. The individual can then monitor these projected amounts when actual inflation or deflation rates become available, and re-project new amounts based on the actual rates. The computer program product provided by the present invention implements the method on a commercially available general purpose computer, preferably a personal computer, which, with the computer product, represents the system provided by the present invention.

The present invention can be used by individuals to determine appropriate levels of expenditures and savings, and to control the funding provided in expense and savings accounts. The present invention can be used in the same way by financial planners as a service to their clients.

The invention takes into account the occurrence of either compounding inflation or compounding deflation. It is the ability of the system to respond to the variations in the inflation and deflation rates over time that enables it to be an effective tool for managing and controlling the levels of an individual's expenditures and savings.

The method provided by the present invention includes the steps of:

a. identifying actual amounts of gross income, income taxes, after-tax income, living costs and savings for a base period of time;

b. projecting a rate of inflation or deflation for the first period in a group of periods, the projected rate being related to the rate of inflation or deflation for the base period;

c. determining rates corresponding to each amount that will be applied to the actual amounts to achieve target amounts for each period, the rates being related to the projected rate of inflation or deflation;

d. converting the rates to factors by dividing each rate by 100 and adding 1;

e. applying each rate to its corresponding amount to achieve the target amounts for each period;

f. determining whether actual rates of inflation or deflation for a period or partial period justifies redetermining the rates to be applied to the actual amounts to achieve the target amounts, and, if so, recalculating target amounts for each period, and entering the target amounts in a record; and g. based on any available actual data, including actual rates of inflation or deflation, determining whether variances exist between targeted amounts and actual amounts for any period, and displaying the variances.

The computer program product provided by the present invention includes:

a. first logic for storing in a first record in the computer actual amounts of gross income, income taxes, after-tax income, living costs and savings for a base period of time;

b. second logic for storing in a second record in the computer a projected rate of inflation or deflation for the first period in a group of periods, said projected rate being related to the rate of inflation or deflation for the base period;

c. third logic for storing in a third record in the computer rates corresponding to each amount that will be applied to the amounts to achieve target amounts for each period, the rates being related to the projected rate of inflation or deflation;

d. fourth logic for converting the rates to factors by dividing each rate by 100 and adding 1, and storing the converted rates into a fourth computer record;

e. fifth logic for applying each rate to its corresponding amount to achieve the target amounts for each period, and storing the target amounts in a fifth computer record;

f. sixth logic for storing in a sixth record in the computer an actual rate of inflation or deflation for the first of the periods and revised rates that are related to the actual rate;

g. seventh logic for recalculating the original or recalculated target amounts based on the actual rate of inflation or deflation and the revised rates, and storing the recalculated target amounts in a seventh record in the computer;

h. eighth logic for calculating variances between targeted amounts and actual amounts for any period, and storing the variances in an eighth record in the computer; and i. ninth logic for displaying the variances.

The system provided by the present invention includes a general purpose computer having electronic records and the ability to maintain the records, a display for displaying information, and an input device by which information may be received by the computer. The system also includes the program product provided by the present invention.

The method, program product and system provided by the present invention can be used as often as the individual believes their use is warranted. For example, the individual may decide to run the method or the system when actual rates of inflation or deflation become available, and the individual wishes to adjust the rates that are applied to the actual amounts to achieve target amounts. The present invention should be used at least on an annual basis, preferably in January of each year, when the actual rate of inflation or deflation is available for the prior year.

BRIEF DESCRIPTION OF THE DRAWING

The following detailed description of the preferred embodiment may be understood better if reference is made to the appended drawing, in which:

FIG. 4 shows in block diagram form the flow-through concept as applied to the model shown in FIG. 2;

FIG. 5 shows in block diagram form an example of the use of the model shown in FIG. 2;

FIG. 6 shows in block diagram form an example of the use of the model shown in FIG. 2;

DETAILED DESCRIPTION OF THE PREFERRED EMBODIMENT

The present invention provides a system, a method and a computer program product for controlling the disposition of financial resources.

Figure 2:
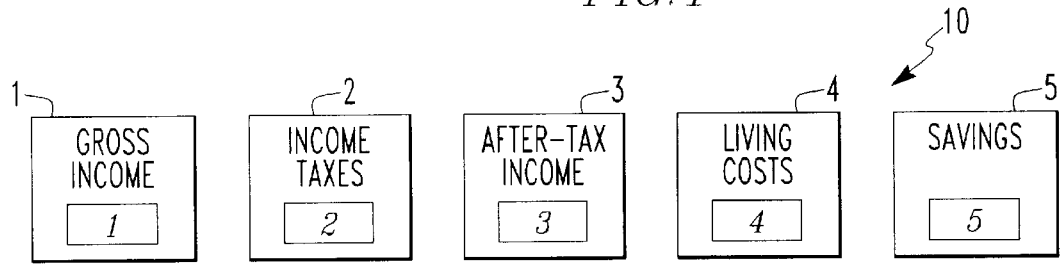
FIG. 2 shows in block diagram form the economic model on which the method provided by the present invention is based.

The preferred method (or profile) 20 provided by the present invention employs a five-step economic model 10, which is shown broadly in FIG. 2 in block diagram form. Model 10 is the foundation for method 20.

FIG. 2 shows the five steps or blocks 1 through 5 of model 10. In using model 10 in the U.S. economy, gross income is determined in step 1 of model 10 by adding together all income from all sources, except those categories that are specifically exempted under the Internal Revenue Code. In step 2, income taxes are determined, including federal, FICA, and possibly state and local taxes and other income-based taxes depending on the state and locality. In step 3, the taxes that were determined in step 2 are subtracted from the gross income determined in step 1 to determine after-tax income. In step 4, living costs are determined. In step 5, the living costs that were determined in step 4 are subtracted from the after-tax income that was determined in step 3 to determine savings. The savings can be placed in many different types of investments to meet future financial goals.

Figure 1:
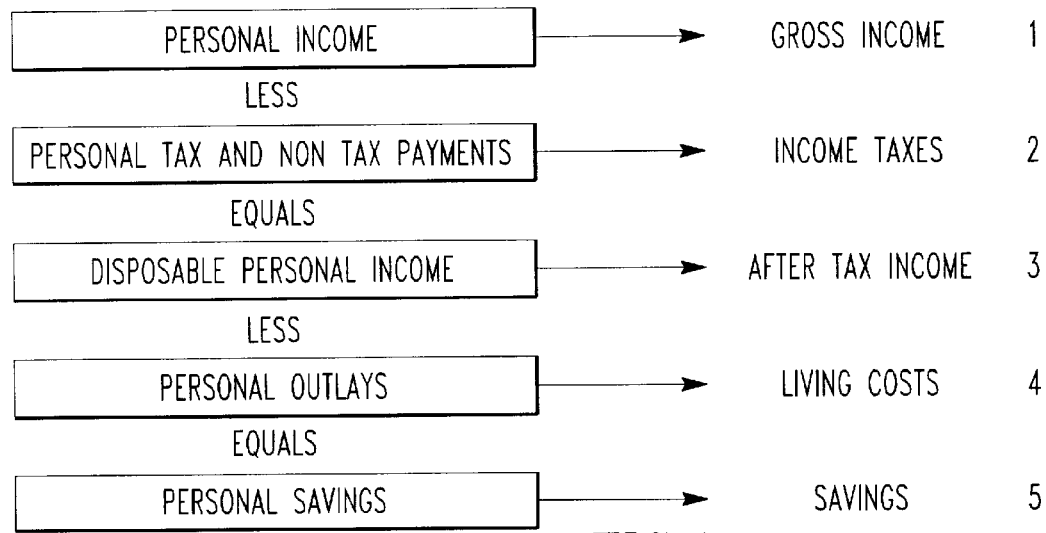
FIG. 1 shows in graphic form the National Income and Product Accounts.

Model 10 shown if FIG. 1 finds its origin in the National Income and Product Accounts as reported by the Bureau of Economic Analysis. FIG. 1 shows the flow of steps that are executed to arrive at 1) personal income, 2) personal tax and non tax payments, 3) disposable personal income, 4) personal outlays, and 5) personal savings. These five categories have been renamed to 1) gross income, 2) income taxes, 3) after-tax income, 4) living costs and 5) savings to arrive at model 10. In summary, the macro concept of the National Income and Product Accounts has been used to design model 10 for personal financial planning. It should be noted that model 10 is representative of the actual sequence of 1) earning income, 2) paying income taxes, 3) arriving at after tax income and then dividing after-tax income among 4) living costs and 5) savings. Model 10, therefore, represents a real life model. Now that the origin of the five step economic model 10 has been identified, the effect of inflation on model 10 and the process for measuring inflation annually will be described. The CPI-U—for urban consumers—as reported by the Department of Labor, which takes into account the buying patterns of professional and salaried workers, part-time workers, the self-employed, the unemployed, retired persons, wage earners, and clerical workers, will be used to monitor increases in living costs.

TABLE 3

CPI Product Groups

| | |
|---|---|
| 1 | Food and Beverages |
| 2 | Housing |
| 3 | Apparel and Upkeep |
| 4 | Transportation |
| 5 | Medical Care |
| 6 | Entertainment |
| 7 | Other Goods and Services |

Table 3 shows the seven product groups of the consumer price index monitored for price change, which include 1) food and beverages, 2) housing, 3) apparel and upkeep, 4) transportation, 5) medical care, 6) entertainment and 7) other goods and services. These seven product groups are monitored to determine the change in the average level of prices.

Figure 3:
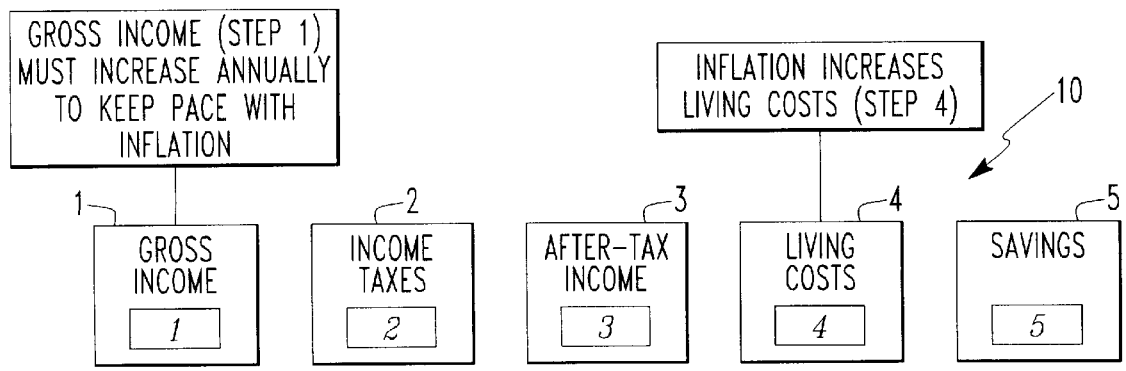
FIG. 3 shows in block diagram form the need for the model shown in FIG. 2.

FIG. 3 shows the need for model 10. In Table 1 it was clearly shown that we live in a world of compounding inflation—that is, living costs escalate at a compound rate. Living costs are identified as step 4 in model 10. As inflation affects a personal financial plan, it generally requires that incomes increase annually to maintain the same standard of living. Although gross income must increase annually to keep pace with inflation, technically speaking it is not gross income (step 1 of model 10) that is used to pay for living costs, but after-tax income (step 3 of model 10). As a result, not only must gross income increase annually to keep pace with inflation, but also—and more importantly—after-tax income must increase. This brings up two important questions that a taxpayer should ask:

(1) Is my gross income keeping pace with inflation annually in percentage terms, as measured by the Consumer Price Index (CPI-U) and (2) If my gross income is keeping pace with inflation, is my after-tax income also keeping pace?

If after-tax income is not increasing at the rate required to keep pace with inflation, there can be only two reasons. One, the percentage increase in gross income is not keeping pace with the percentage increase in inflation, as measured by the CPI, or two, the percentage increase in gross income is keeping pace—perhaps even exceeding the percentage increase in inflation—but this increase is offset by a rise in income tax rates.

The Flow-Through Concept Defined

At this point it has been shown that inflation increases living costs at a compound rate. It has also been shown that after-tax income is used to meet living costs. In simple terms, the flow-through concept states that in order to maintain the same standard of living, annual percentage increases in gross income that are needed to keep pace with inflation must flow through from gross income to after-tax income. For example, if the inflation rate is 4 percent in the current year, then gross income and after-tax income should increase by at least 4 percent, assuming that the entire budget for living costs increases with inflation. If this does not occur, the standard of living could begin to decline, the savings rate could begin to decline, or both could decline. FIG. 4 illustrates this concept.

The following illustrates use of model 10 in method 20 provided by the present invention.

FIG. 5 shows model 10 for a married U.S. household (husband and wife with no children). The married couple has combined gross earned income of $40,000 in 1995 (step 1 of model 10), which is subject to federal, FICA, state, and local income taxes. Income taxes for the married couple total $8,848 (step 2 of model 10)—based on the assumed tax rates for 1995 in the state of Pennsylvania. The couple's after-tax income is $31,152 (step 3 of model 10), which is gross income minus income taxes. Assuming that the couple saves 15 percent of their after-tax income (step 5 of model 10), living costs (step 4 of model 10) are $26,479. The $26,479 of living costs includes expense items in the seven product groups of the CPI. Savings (step 5) equals $4,673 (step 3 minus step 4).

Dollar and Percentage Amounts in The Five-Step Economic Model

Using the five-step economic model 10 enables one to determine two primary pieces of information: first, how gross income in dollar amounts is allocated among income taxes, after-tax income, living costs, and savings; and second, the percentage amounts that income taxes, after-tax income, living costs, and savings represent within the model. FIG. 6 presents the dollar and percentage amounts for the married household with no children.

In model 10, gross income minus income taxes will always equal after-tax income and after-tax income minus living costs will always equal savings. The percentage calculations of income taxes (step 2 of model 10) and after-tax income (step 3 of model 10), will always be expressed as a percentage of gross income (step 1 of model 10), and the percentage calculations of living costs (step 4 of model 10) and savings (step 5 of model 10) will always be expressed as a percentage amount of after-tax income (step 3 of model 10). Thus, in FIG. 6, income taxes are 22 percent of gross income ($8,848 divided by $40,000=22%), and after-tax income is 78 percent of gross income ($31,152 divided by $40,000=78%). Twenty-two percent and 78 percent add up to 100 percent, and $8,848 plus $31,152 equals $40,000.

Continuing with this example, living costs are 85 percent of after-tax income ($26,479 divided by $31,152=85%), and savings represent 15 percent of after-tax income ($4,673 divided by $31,152=15%). Eighty-five percent plus 15 percent equals 100 percent, and $26,479 plus $4,673 totals $31,152. In this example, the savings rate is 15 percent.

It should be noted that the manner in which the dollar amounts and percentage allocations were determined for gross income, income taxes, after tax income, living costs and savings follows the same format of how personal income, tax and non tax payments, disposable personal income, personal outlays and personal savings are reported in the National Income and Product Accounts indicated in FIG. 1. This format represents how the government monitors aggregate income, tax, after-tax income, living cost and savings data for the country.

Mechanics of The Five-Step Economic Model

The mechanics of model 10 as shown in FIG. 6 represents the foundational principles on which a successful long-term financial plan is built—using method 20 provided by the present invention. Many individuals probably do not know how much of their gross income goes to income taxes each year and how much flows through to after-tax income. Furthermore, they probably would not know how much of their after-tax income was being spent on living costs and how much was saved. To establish a financial plan one must know the dollar and percentage allocations of gross income going to income taxes and after-tax income and the dollar and percentage allocations of after-tax income going to living costs and savings. The five-step economic model 10 allows one to accomplish these calculations.

Model 10 will be used in three different inflationary scenarios. This will represent the three primary modes in which model 10 is utilized in an inflationary environment. The first example will illustrate after-tax income that increases at the same rate as projected inflation. That is, in nominal terms it is increasing, but in real (inflation adjusted) terms it is not increasing, it is simply keeping pace with inflation. The second example will illustrate after-tax income increasing at a greater rate than projected inflation. That is, in nominal terms it is increasing, and in real (inflation adjusted) terms it is also increasing. Finally, the third example will illustrate after-tax income increasing at a lesser rate than projected inflation. That is, in nominal terms it is increasing, but in real (inflation adjusted) terms it is decreasing.

The goal in the first scenario is to maintain the same standard of living and savings rate each year. The goal in the second scenario is to improve the standard of living, increase the savings rate, or both. In the third scenario the goal is to live within one's means. It should be noted that these three approaches are guidelines, not exact procedures, for establishing a financial plan, since not all prices move exactly with the average change in prices as reported by the CPI. Some categories of living costs increase at greater or lesser rates than the rate of inflation. Furthermore some living costs—such as a fixed mortgage payment or a fixed car loan—do not increase with inflation. Therefore, the user of model 10 is free to assign to each type of living cost whatever rates of increase the user believes is appropriate. Obviously, however, the more accurate the rate assigned, the more useful model 10 is to the user. The first scenario—after-tax income increasing at the same rate as inflation—is presented below.

TABLE 4

After-Tax Income Increasing At The Same Rate As Inflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 | $4,673 |
|  | × 1.04 = | × 1.04 = | × 1.04 = | Variable Costs × 1.04 + Fixed Costs = | STEP 3– STEP 4 |
| 1996 | $41,600 | $9,202 | $32,398 | $27,196 | $5,202 |
| Increase | 4% | 4% | 4% | 3% | 11% |

Table 4 shows the 1995 dollar amounts for the married household with no children. In this example it is assumed that the year 1995 has just ended and inflation is projected to be 4 percent for 1996. The 4 percent increase used in model 10 represents the growth rate. The growth rate, when using model 10, is a percentage rate that is less than, equal to, or greater than projected inflation—speaking here of using model 10 in an inflationary economic environment. Subsequently use of model 10 in a deflationary economic environment will be illustrated.

For 1996 after-tax income to keep pace with the projected 4 percent rate of inflation, 1995 gross income, income taxes, and after-tax income all must be increased by 4 percent. The 4 percent increase will then be applied only against the 1995 living costs that are variable to arrive at the projected 1996 living cost figures. Any items that are fixed in amount remain the same in 1996. The couple has three living cost items that are fixed in amount: a mortgage, a car loan, and a credit card payment. If a fixed payment loan were to be paid off in the upcoming year, only the remaining balance would be included in the living costs total. Savings is the difference between steps 3 and 4 of model 10.

To arrive at the couple's 1996 amounts for gross income, income taxes, after-tax income, and the variable living cost components requires multiplying the 1995 figures by 1.04—the conversion factor representing a 4 percent inflation rate. That factor was determined using the conversion formula—that is, dividing the annual inflation rate (4 percent in this example) by 100 and then adding 1 (4 divided by 100+1= 1.04). Multiplying the 1995 amounts by 1.04—which sets up the flow through process from gross income to after-tax income—gives us the couple's 1996 projected amounts, assuming inflation increases by 4 percent. It should be noted that the 4 percent increase in gross income flows through to after-tax income because income taxes remain a constant percentage, even though they increase in dollar amount (1996 income taxes of $9,202 are 22.12 percent of 1996 gross income of $41,600, which is the same percentage rate as in 1995). Table 5 shows the 4 percent increase in variable living costs that is used to arrive at the 1996 amounts. The 1996 fixed amounts are simply the same as in 1995.

TABLE 5

Projecting Living Costs - Step 4 of the model

|  | 1995 Actual Living Costs | × 1.04 = | 1996 Projected Living Costs |
|---|---|---|---|
| Food and Beverages | $ 4,501 |  | $ 4,681 |
| Food |  |  |  |
| Housing |  |  |  |
| Mortgage | $ 6,046 | Fixed Payment | $ 6,046 |
| Real Estate Taxes | 2,800 |  | 2,912 |
| Utilities/Household Expenses | 1,850 |  | 1,924 |
| Homeowner's Insurance | 725 |  | 754 |
| Subtotal | $ 11,421 |  | $ 11,636 |
| Apparel and Upkeep | $ 1,589 |  | $ 1,653 |
| Clothing |  |  |  |
| Transportation |  |  |  |
| Auto Loan | $ 2,450 | Fixed Payment | $ 2,450 |
| Car Insurance | 875 |  | 910 |
| Gasoline and Repairs | 901 |  | 937 |
| Public Transportation | 275 |  | 286 |
| Subtotal | $ 4,501 |  | $ 4,583 |
| Medical Care |  |  |  |
| Medical Costs/Insurance | $ 1,194 |  | $ 1,242 |
| Dental/Eye Examinations | 475 |  | 494 |
| Prescription Drugs | 185 |  | 192 |
| Subtotal | $ 1,854 |  | $ 1,928 |
| Entertainment |  |  |  |
| Vacations | $ 559 |  | $ 581 |
| Fitness Programs | 375 |  | 390 |
| Video Rentals | 125 |  | 130 |
| Subtotal | $ 1,059 |  | $ 1,101 |
| Other Goods and Services |  |  |  |
| Life Insurance | $ 500 |  | $ 520 |
| Credit Card Debt | 50 | Fixed Payment | 50 |
| Charitable Giving | 125 |  | 130 |
| Personal Care Items | 879 |  | 914 |
| Subtotal | $ 1,554 |  | $ 1,614 |
| Total Living Costs | $ 26,479 |  | $ 27,196 |

As illustrated in Table 5, the projected living costs for 1996 are $27,196. Subtracting this amount from the couple's projected 1996 after-tax income of $32,398 (see Table 4) equals their projected savings of $5,202. As indicated in Table 5, because not all living costs increase with inflation, the couple's savings increased 11 percent (which is more than the projected 4 percent inflation rate—see Table 4).

It should be noted in Table 4 that because after-tax income increased 4 percent, while living costs only increased 3% due to a portion being fixed, a real increase was experienced of 1 percent (4% minus 3%, real denoting the percentage increase in after-tax income over that of inflation). For the purposes of this model (in both inflationary and deflationary economic environments) the term real will refer to the percentage increase or decrease in inflation or deflation adjusted living costs, relative to an individual's personal situation rather than the economy as a whole, as compared with the percentage increase in after-tax income. This is because the potential exists for a portion of living costs to be fixed in amount within a personal financial plan, and therefore not share in the rise or fall in the average level of prices (inflation or deflation). Therefore, although the CPI reading is an aggregate number, it affects an individual's living costs based upon the composition of their budget, that is, how much of living costs are fixed and how much are variable, which will vary from individual to individual. An example of after-tax income increasing at a greater rate than inflation will now be examined.

TABLE 6

After-Tax Income Increasing More Than The Rate of Inflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 Variable Costs | $4,673 |
|  | × 1.06 = | × 1.06 = | × 1.06 = | × 1.04 + Fixed Costs = | STEP 3– STEP 4 |
| 1996 | $42,400 | $9,379 | $33,021 | $27,196 | $5,825 |
| Increase | 6% | 6% | 6% | 3% | 25% |

In Table 6 the 1995 dollar amounts for the married household with no children are the same as in Table 4, and inflation for 1996 is also projected to be 4 percent. Again, living costs, excluding the fixed mortgage, auto loan, and credit card payment, are variable, but this scenario assumes that the couple is able to outpace inflation because their after-tax income is increasing at a 6 percent growth rate—2 percent above the projected rate of inflation—which would seem to result in a real increase of 2 percent in after-tax income. However, because the fixed living cost components do not increase with inflation, the real increase is actually greater, 3 percent in this example.

Therefore, 1995 gross income, income tax, and after-tax income are multiplied by 1.06, but the variable living cost components will increase by only by 4 percent (using 1.04 as the conversion factor). The 1995 fixed costs are then added to the 1996 inflation-adjusted costs. Savings is determined by taking the difference between the amounts determined in steps 3 and 4 of model 10. The projected 6 percent increase in gross income flows through to after-tax income because income taxes again remain a constant percentage although they increase in dollar amount. As a result, the couple experiences a real increase in after-tax income of 3%, which will augment savings by 25 percent—from $4,673 in 1995 to $5,825 in 1996. If the real increase in after-tax income is not used to increase savings, it could be used to improve the standard of living (spending more money on living costs than is necessary to keep pace with inflation). The third scenario for using the model in an inflationary environment—after-tax income increasing less than the rate of inflation will now be illustrated.

TABLE 7

After-Tax Income Increasing Less Than The Rate Inflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 Variable Costs | $4,673 |
|  | × 1.02 = | × 1.02 = | × 1.02 = | × 1.06 + Fixed Costs = | STEP 3– STEP 4 |
| 1996 | $40,800 | $9,025 | $31,775 | $27,559 | $4,216 |
| Increase | 2% | 2% | 2% | 4% | –10% |

Table 7 shows the same 1995 dollar amounts for the married household with no children. In this example, however, it is assumed that the inflation rate will be 6 percent, but after-tax income will increase at only 2 percent, 4 percent below the projected rate of inflation.

As in Tables 4 and 6, it will again be assumed that, except for the fixed mortgage, auto loan, and credit card payment, living costs are variable. Because after-tax income will increase at a lesser percentage rate than inflation, there will be a real decrease in after-tax income. In this example, the real decrease is 2 percent. It should be noted that because only variable living costs increase with inflation and the budget also contains fixed components, the real decrease is 2 percent (2% increase in after-tax income minus 4% inflation), not 4 percent (2% increase in after-tax income minus 6% inflation)—as not all living costs are increasing.

In Table 7, therefore, the couple's 1995 gross income, income tax, and after-tax income amounts will be increased by 2 percent (a conversion factor of 1.02). However, the variable living cost components will be increased by 6 percent (a conversion factor of 1.06). The next step is to add the 1995 fixed costs to the 1996 inflation-adjusted costs and subtract the dollar amount in step 4 from the dollar amount in step 3 to determine the couple's savings. Although the 2 percent increase in gross income flows through to after-tax income because income taxes remain a constant percentage, the increase in living cost—despite the 6% inflation rate— will only be 4% (due to a portion of living costs being fixed in amount). As a result, a real decrease in after-tax income will occur that will reduce the couple's savings by 10 percent—from $4,673 to $4,216.

One final point to note is that in establishing the couple's financial plan in the scenario presented in Table 7, the projected increase to living costs (step 4) could have been forecast to be less than the rate of inflation. A lesser rate could have been projected if the couple believed that they would be able to contain costs by controlling their expenses—for example, staying away from certain food groups that are increasing in price, shopping at discount outlets, lowering their standard of living, or simply deferring some expenditures.

Three Deflationary Scenarios

The five-step economic model 10 will be illustrated below for three different deflationary scenarios. Although method 20 was designed to be used primarily in an inflationary scenario, it can also be used during a deflationary scenario. It must be mentioned that during the 46 year period 1949 through 1994 there were only 2 deflationary years—1949 and 1954. Beginning with 1913 and going forward through 1994, deflationary years occurred during 1921, 1922, 1926 through 1928, 1930 through 1932, 1938, 1949 and 1954. If deflation were to return on a continuing basis, it most likely would be a result of an extraordinary economic event.

The first example will illustrate after-tax income that declines at the same rate as projected deflation. That is, in nominal terms after-tax income is decreasing, but in real (inflation adjusted) terms it is not decreasing, it is simply keeping pace with deflation (falling at the same rate as deflation). The second example illustrates the rate of decline in after-tax income being less than the rate of deflation. That is, in nominal terms after-tax income is decreasing, but in real (inflation adjusted) terms it is increasing. Finally, the third example illustrates the decline in after-tax income being greater than the rate of deflation. That is, in nominal terms after-tax income is decreasing, and in real (inflation adjusted) terms its also decreasing.

The goal in the first scenario is to maintain the same standard of living and savings rate each year. The goal in the second scenario is to improve the standard of living, increase the savings rate, or both. In the third scenario the goal is to enable an individual to live within his or her means. It should be noted again these three approaches are guidelines, not exact procedures, for establishing a financial plan, since not all prices move exactly with the average change in prices as reported by the CPI. Furthermore some living costs—such as a fixed mortgage payment or a fixed car loan—do not decrease with deflation.

TABLE 8

After-Tax Income Decreasing At The Same Rate As Deflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 | $4,673 |
|  | × .96 = | × .96 = | × .96 = | Variable Costs × .96 + Fixed Costs = | STEP 3– STEP 4 |
| 1996 | $38,400 | $8,494 | $29,906 | $25,762 | $4,144 |
| Decrease | –4% | –4% | –4% | –3% | –11% |

Table 8 shows the 1995 dollar amounts for the married household with no children. In this example it will be assumed that the year 1995 has just ended and that deflation for 1996 will be projected at 4 percent. The 4 percent decrease represents the projected decline in the price level.

For 1996 after-tax income to keep pace with the projected 4 percent rate of deflation, 1995 gross income, income taxes, and after-tax income must be decreased by 4 percent. The 4 percent decrease will then be applied only against the 1995 living costs that are variable to arrive at the projected 1996 living cost figures. Obviously, any items that are fixed in amount remain the same amount in 1996.

The couple again has the same three living cost items that are fixed in amount: the mortgage, a car loan, and a credit card payment. (Again, if a fixed payment loan were to be paid off in the upcoming year, only the remaining balance would be included in the living costs total.) Savings is the difference between steps 3 and 4.

To arrive at the couple's 1996 amounts for gross income, income taxes, after-tax income, and the variable living cost components requires multiplying the 1995 figures by 0.96— the conversion factor representing a 4% deflation rate. That factor is determined using the conversion formula—that is, dividing the annual deflation rate (–4 percent in our example) by 100 and then adding 1 (–4 divided by 100+1= 0.96). Multiplying the 1995 amounts by 0.96, which sets up the flow through process from gross income to after-tax income, gives us the couple's 1996 projected amounts, assuming deflation of 4 percent. It should be noted that the 4 percent decrease in gross income flows through to after-tax income because income taxes remain a constant percentage, even though they decrease in dollar amount (1996 income taxes of $8,494 are 22.12 percent of 1996 gross income of $38,400, which is the same percentage rate as in 1995).

The projected living costs for 1996 are $25,762. Subtracting this amount from the couple's projected 1996 after-tax income of $29,906 equals their projected savings of $4,144. Because not all living costs decrease with deflation, the couple's savings decreased 11 percent (which is more than the projected 4 percent deflation rate). It should be noted that in this example a real decrease occurred of 1 percent (4 percent decline in after-tax income minus a 3 percent decline in living costs, –4 minus –3 equals –1). The scenario in which after-tax income decreases less than deflation is described below.

TABLE 9

After-Tax Income Decreasing Less Than The Rate Of Deflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 | $4,673 |
|  | × .98 = | × .98 = | × .98 = | Variable Costs × .96 + Fixed Costs = | STEP 3– STEP 4 |
| 1996 | $39,200 | $8,671 | $30,529 | $25,762 | $4,767 |
| Decrease | –2% | –2% | –2% | –3% | 2% |

In Table 9 the 1995 dollar amounts for the married household with no children are the same as in Table 8, and deflation for 1996 is also projected to be 4 percent. Again, living costs, excluding the fixed mortgage, auto loan, and credit card payment, are variable, but this scenario assumes their after-tax income is declining at a 2 percent rate, 2 percent less than the projected rate of deflation of 4 percent, yielding a real increase in after-tax income of 1 percent (due to a portion of living costs being fixed in amount and not sharing in the decline in prices).

Therefore, 1995 gross income, income tax, and after-tax income are multiplied by 0.98, but the variable living cost components will decrease by only by 4 percent (using 0.96 as the conversion factor). The 1995 fixed costs are then added to the 1996 deflation-adjusted costs. Savings is determined by taking t he difference between steps 3 and 4. Again, it should be noted that the projected 2 percent decrease in gross income flows through to after-tax income because income taxes again remain a constant percentage although they decrease in dollar amount. As a result, the couple experiences a real increase in after-tax income of 1%, which will increase savings by 2 percent—from $4,673 in 1995 to $4,767 in 1996. If the real increase in after-tax income is not used to increase savings, it could be used to improve the standard of living (spending more money on living costs than is necessary to keep pace with deflation). Now the third scenario will be examined: after-tax income decreasing more than the rate of deflation.

TABLE 10

After-Tax Income Decreasing More Than The Rate Of Deflation

| Year | Step 1 Gross Income | Step 2 Income Taxes | Step 3 After-Tax Income | Step 4 Living Costs | Step 5 Savings |
|---|---|---|---|---|---|
| 1995 | $40,000 | $8,848 | $31,152 | $26,479 Variable Costs | $4,673 |
|  | × .94 = | × .94 = | × .94 = | × .98 = Fixed Costs = | STEP 3– STEP 4 |
| 1996 | $37,600 | $8,317 | $29,283 | $26,123 | $3,160 |
| Decrease | –6% | –6% | –6% | –1% | –32% |

Table 10 has the same 1995 dollar amounts for the married household with no children. In this example, however, it will be assumed that the deflation rate will be 2 percent but after-tax income will decrease at 6 percent, 4 percent more than the projected rate of deflation.

As in Tables 8 and 9, it will again be assumed that, except for the fixed mortgage, auto loan, and credit card payment, living costs are variable. Because after-tax income will decrease at a greater percentage rate than deflation, there will be a real decrease in after-tax income. In this case, the real decrease is 5 percent (due to a portion of living costs being fixed in amount and not sharing in the decline in prices).

In Table 10, therefore, the couple's 1995 gross income, income tax, and after-tax income amounts will be decreased by 6 percent (a conversion factor of 0.94). However, the variable living cost components will be decreased by 2 percent (a conversion factor of 0.98). The next step is to add the 1995 fixed costs to the 1996 deflation-adjusted costs and subtract the dollar amount in step 4 from the dollar amount in step 3 to determine the couple's savings. Although the 6 percent decrease in gross income flows through to after-tax income because income taxes remain a constant percentage, the 2 percent decrease in the variable living cost components (due to a 2 percent deflation rate) will result in an overall decrease to living costs of 1 percent. As a result, a decrease will occur that will reduce the couple's savings by 32 percent—from $4,673 to $3,160.

In establishing the couple's financial plan in this last scenario, it should be noted that the projected decrease to living costs (step 4 of model 10) could have been forecast to be greater than the rate of deflation. A greater rate could have been projected if the couple believed that they would be able to lower costs beyond that as caused by a falling price level.

Method 20

Now that the mechanics of model 10 have been described, The 5 Step Economic Model Profile 20—an expanded version of the five-step economic model 10—will be described. Profile 20 constitutes the preferred embodiment of the method provided by the present invention. Method 20 can be used to design, implement and monitor a personal financial plan, and, thus, to manage and control the disposition of personal financial resources. Everything described to this point regarding model 10 and how it can be used in inflationary and deflationary economic environments was necessary instruction for actual use of method 20.

Preferred method 20 includes the following steps:
a. Determine the years that will be covered by the projections that are created using method 20;
b. Determine whether the inflationary or deflationary mode will be used;
c. Determine whether income will be targeted to increase or decrease, and whether the rate of change will be greater or lesser than or the same as the rate of inflation or deflation, as reported by the CPI;
d. Determine the actual amounts for gross income, income taxes, after tax income, living costs and savings for the base year (the year immediately preceding the first year of the projection). Care should be taken to carefully examine the living cost categories so as to include only those categories that will be used in the coming year(s);
e. Determine for each of the amounts, and for the amount in each category of living costs, for each year of the projection, the rate of that will be applied to the amount, which amounts are based on the actual rate of inflation or deflation; the rates for gross income, income taxes and after-tax income are, preferably, the same, in accordance with the flow-through concept.
f. Convert each rate to a factor by dividing it by 100 and adding 1.
g. Multiply each amount for each year of the projection by its converted rate to achieve the target amount (the target amounts for each year following the first year of the projection will be calculated by multiplying the target amounts of the prior year by the rate of increase or decrease chosen for that year, which change should be related to the projected reading of the CPI);
h. Determine actual rates of inflation and deflation as they become available; if they differ from the projected rates, or if other available data indicates that the rates should be revised, revise the rates and recalculate the targeted amounts for each year in the projection;
i. Once it is determined that the rates are accurate, based on acutal rates of inflation or other available data, insert actual amounts and then compare targeted amounts with actual amounts for the current year, and determine variances between actual amounts and targeted amounts for the current year.

Accordingly, the variances will allow the individual to determine whether savings goals or spending budgets must be adjusted.

Establishing Goals

To properly manage a financial plan over long periods of time using method 20, one must first establish their goals for each step of model 10. Then one must compare actual results to their goals, which will immediately point out any differences. Therefore, as we continue to work with model 10 in describing method 20, we will be comparing actual amounts to target amounts (the desired goals). This will allow one to determine if differences between actual and target amounts are occurring on a year-to-year basis and whether one is meeting (and perhaps even exceeding) their goals.

Figure 7:
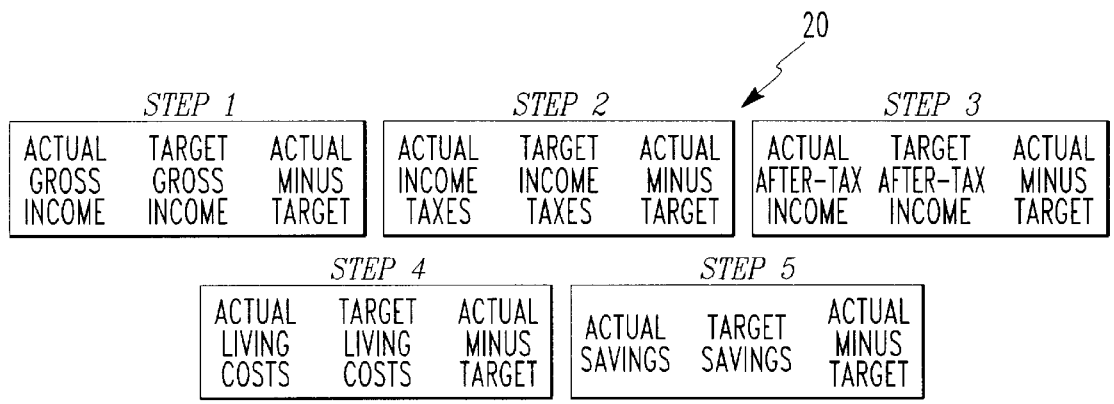
FIG. 7 shows in block diagram form the preferred method provided by the present invention.

FIG. 7 shows part of method 20, in which the rates are applied to actual amounts for gross income, income taxes, after tax income, living costs and savings, and then the differences, or variances, between targeted and actual amounts as calculated. Method 20 should be viewed as a financial planning road map. Its ultimate purpose is to allow the user to establish guidelines for maintaining or improving their standard of living, taking inflation (deflation) into account, while at the same time meeting savings goals. Method 20 enables one to accomplish this by establishing target amounts for gross income, income taxes, after-tax income, living costs, and savings based on a growth rate that is less than, equal to, or greater than the projected rate of inflation or deflation. Table 11 shows a five-year projection using method 20, called the five year, five step economic model profile.

TABLE 11

The Five Year, Five-Step Economic Model Profile

| Year | Actual Gross Income | Target Gross Income | Actual minus Target | Actual Income Taxes | Target Income Taxes | Actual minus Target | Actual After-Tax Income | Target After-Tax Income | Actual minus Target |
|---|---|---|---|---|---|---|---|---|---|
| Base | | | | | | | | | |
| 1 | | | | | | | | | |
| 2 | | Step 1 | | | Step 2 | | | Step 3 | |
| 3 | | | | | | | | | |
| 4 | | | | | | | | | |
| 5 | | | | | | | | | |
| Total | | | | | | | | | |

| Year | Actual Living Costs | Target Living Costs | Actual minus Target | Actual Savings | Target Savings | Actual minus Target |
|---|---|---|---|---|---|---|
| Base | | | | | | |
| 1 | | | | | | |
| 2 | | Step 4 | | | Step 5 | |
| 3 | | | | | | |
| 4 | | | | | | |
| 5 | | | | | | |
| Total | | | | | | |

Use of the five-year, five-step economic model profile will now be illustrated, assuming the year 1995 has just ended and annual target amounts for each year from 1996 through 2000 are projected. (As a rule, it is recommended that the user develop projections for five-year periods). For purposes of this example, the reference will be made to the information for 1995 for the married household with no children presented earlier. Their combined gross earned income is $40,000; aggregate federal, FICA, state, and local income taxes are $8,848; after-tax income is $31,152; living costs are $26,479; and savings are $4,673.

Because the purpose of the profile is to determine target amounts for gross income, income taxes, after-tax income, living costs, and savings, it is necessary to start with beginning base amounts. These beginning base amounts are not arbitrary numbers but are the actual amounts (in each of the five steps of the economic model) for the year prior to the beginning year of the profile (called the base year—1995 in our example).

The next step is to project target amounts for each step of the profile. Although the model can be used in both inflationary and deflationary scenarios, only an inflationary scenario where the goal is to keep pace with inflation will be illustrated. Although it will only be illustrated in this scenario, it can be adapted to work in any type of economic situation one wishes to project (outpacing, keeping pace with, or lagging inflation or deflation).

Projecting Target Amounts

It will be assumed that the annual rate of inflation is expected to be 2.5% during the five-year period from 1996 to 2000. To increase the base year's target amounts by this projected inflation rate, it is necessary to use the conversion formula to change the annual rate of inflation into a conversion factor. Changing the annual rate of inflation into a conversion factor is necessary to calculate the effect of compounding inflation. In this example, dividing our projected inflation rate of 2.5% by 100 and adding 1 equals 1.025—the conversion factor. It should be noted that if there is no inflation, the amounts will remain constant from the prior year to the current year. If there is deflation, the conversion factor will be less than 1. In Table 12 the base amounts have been inserted into the five-step economic model profile 20. It should be noted here that the rates that are used to calculate target amounts need not be equal to the rate of inflation or deflation, and need not be the same for all amounts, or for the amounts for all categories of living costs. However, in accordance with the flow-through concept, the rates for gross income, income taxes and after-tax income should be the same.

TABLE 12

The Five-Step Economic Model Profile

| Year | Actual Gross Income | Target Gross Income | Actual minus Target | Actual Income Taxes | Target Income Taxes | Actual minus Target | Actual After-Tax Income | Target After-Tax Income | Actual minus Target |
|---|---|---|---|---|---|---|---|---|---|
| 1995 | $40,000 | | | $8,848 | | | $31,152 | | |
| | | Step 1 | | | Step 2 | | | Step 3 | |
| 1996 | | × 1.025 = $41,000 | | | × 1.025 = $9,069 | | | × 1.025 = $31,931 | |
| 1997 | | × 1.025 = $42,025 | | | × 1.025 = $9,296 | | | × 1.025 = $32,729 | |
| 1998 | | × 1.025 = $43,076 | | | × 1.025 = $9,528 | | | × 1.025 = $33,547 | |
| 1999 | | × 1.025 = $44,153 | | | × 1.025 = $9,767 | | | × 1.025 = $34,386 | |
| 2000 | | × 1.025 = $45,256 | | | × 1.025 = $10,011 | | | × 1.025 = $35,246 | |

TABLE 12-continued

The Five-Step Economic Model Profile

| Year | Actual Living Costs | Target Living Costs | Actual minus Target | Actual Savings | Target Savings | Actual minus Target |
|---|---|---|---|---|---|---|
| 1995 | $26,479 | | | $4,673 | | |
| | | Step 4 | | | Step 5 | |
| | Variable Costs* | | | Step 3 Minus Step 4 | | |
| 1996 | Variable Costs × 1.025 + Fixed Costs = $26,929 | | | ($31,931 − $26,929) $5,002 | | |
| 1997 | Variable Costs × 1.025 + Fixed Costs = $27,389 | | | ($32,729 − $27,389) $5,340 | | |
| 1998 | Variable Costs × 1.025 + Fixed Costs = $27,860 | | | ($33,547 − $27,860) $5,687 | | |
| 1999 | Variable Costs × 1.025 + Fixed Costs = $28,342 | | | ($34,386 − $28,342) $6,044 | | |
| 2000 | Variable Costs × 1.025 + Fixed Costs = $28,835 | | | ($35,246 − $28,835) $6,411 | | |

To arrive at the annual target amounts for the period 1996 through 2000, it is necessary to increase 1995 actual gross income, income taxes and after-tax income (steps 1–3) by the projected rate of inflation. Because the actual amounts will all be increased by the same rate of inflation, the increase in target gross income flows through to target after-tax income.

This same 2.5% rate of increase is then applied to variable living costs. In this example, three components are fixed in amount and therefore do not increase with inflation: a mortgage payment, an auto loan payment, and a credit card payment. These are the same 1995 living costs illustrated earlier.

Applying the 2.5% rate of increase only to the variable living costs increases the 1995 $26,479 living costs to $26,929. It should be noted that if all living costs were variable, the 1995 living costs would have to increase to $27,141 ($26,479×1.025). Savings are calculated by taking the difference between target after-tax income and target living costs.

The same procedure used to calculate the 1996 target amounts is then repeated to arrive at the target amounts for the years 1997, 1998, 1999, and 2000. Each year's target amounts become the base year amounts to which the 2.5% growth rate is applied for the following year.

Revising Target Amounts and Entering Actual Amounts

Now the actual amounts are entered into the five-year, five-step economic model profile for the year 1996. The user should update the profile using actual amounts as soon as the information is available. In this example, the actual figures for 1996 will be available sometime in early 1997, along with the 1996 actual rate of inflation. At the beginning of each new year, there are two main sources of information to be utilized. The first will be the actual amounts for the year just ended—that is, the amounts for actual gross income, income taxes, after-tax income, living costs, and savings. The second will be the actual rate of inflation for the year just ended. Tax information can be compiled from tax returns and FICA payment information. The annual rate of inflation for the year just ended is reported through financial publications, radio, and television.

Returning to the married couple, it is assumed that their actual amounts for 1996 are as follows: Gross income was $41,200; income taxes were $9,113; after-tax income was $32,087; living costs were $27,210; and savings were $4,877. Let's also assume that the actual rate of inflation for 1996 was 4.0%.

After obtaining the actual figures for gross income, income taxes, after-tax income, living costs, savings, and the actual rate of inflation for 1996, two steps are taken. First, the originally projected 1996 target amounts are adjusted to revised target amounts. Second, the actual amounts are entered into the economic profile. The 1996 target amounts were originally projected using a 2.5% inflation rate. Now, at the beginning of 1997, it is known that the actual rate of inflation for 1996 was 4%, so it is necessary to go back and multiply the 1995 base amounts by a 1.04 conversion factor (representing the actual 4% inflation rate for 1996) instead of the 1.025 conversion factor, representing the projected 2.5% inflation rate.

When the target amounts were originally projected, the best estimate of what the coming year's rate of inflation would be was used. Now, at the end of the year it is necessary to compare the actual rate of inflation with the estimate that was used to recalculate the target amounts if necessary. If actual inflation differed from the estimated rate of inflation, then it is necessary to adjust the target amounts based on the objective that was sought.

In the example, the objective was to keep pace with inflation and a 2.5% rate was originally projected. Because the actual rate of inflation was 4%, it was necessary to revise the target amounts to reflect the 4% rate. Now, as a result, it is possible to calculate the exact amount by which the goals have not been reached, and include that as a portion of what is necessary to make up over the coming one to five years.

If the actual rate of inflation had matched the estimate, no change in target amounts would have been necessary. Table 13 shows the couple's actual amounts and updates the originally projected 1996 target amounts to revised target amounts based on the actual inflation rate of 4% versus the 2.5% originally projected.

TABLE 13

Revising The Five Year, Five-Step Economic Model Profile

| Year | Actual Gross Income | Target Gross Income | Actual minus Target | Actual Income Taxes | Target Income Taxes | Actual minus Target | Actual After-Tax Income | Target After-Tax Income | Actual minus Target |
|---|---|---|---|---|---|---|---|---|---|
| 1995 | $40,000 | | | $8,848 | | | $31,152 | | |
| | Step 1 | | | Step 2 | | | Step 3 | | |
| | 1 Actual Amount | 2 Revised x 1.04 = | 3 Difference | 1 Actual Amount | 2 Revised x 1.04 = | 3 Difference | 1 Actual Amount | 2 Revised x 1.04 = | 3 Difference |
| 1996 | $41,200 | $41,600 | –$400 | $9,113 | $9,202 | –$89 | $32,087 | $32,398 | –$311 |
| | 3.00% Increase Actual Gross Income | 4.00% Actual Inflation | –1.00% Difference | 3.00% Increase Actual Income Taxes | 4.00% Actual Inflation | –1.00% Difference | 3.00% Increase Actual After-Tax Income | 4.00% Actual Inflation | –1.00% Difference |

| Year | Actual Living Costs | Target Living Costs | Actual minus Target | Actual Savings | Target Savings | Actual minus Target |
|---|---|---|---|---|---|---|
| 1995 | $26,479 | | | $4,673 | | |
| | Step 4 Variable Costs* | | | Step 5 | | |
| | 1 Actual Amount | 2 Revised x 1.04 + Fixed Costs = | 3 Difference | 1 Actual Amount | 2 Revised Step 3 Minus Step 4 | 3 Difference |
| 1996 | $27,210 | $27,196 | $14 | $4,877 | $5,202 | –$325 |
| | 2.76% Increase Actual Living Costs | 2.71% Increase Based on Actual Inflation | 0.05% Difference | 4.37% Increase Actual Savings | 11.32% Increase Based on Actual Inflation | –6.95% Difference |

Revising the five-step economic model profile is a three-step process:

(1) The originally projected target amounts are changed to revised target amounts, if necessary, basing the revision on the actual rate of inflation or deflation.
(2) The actual amounts are inserted into the profile.
(3) The revised target amounts are subtracted from the actual amounts (actual minus target) to determine the differences.

The percentage increases from 1995 to 1996 are shown in Table 13 for each step of the profile. The annual percentage changes (from 1995 to 1996) for both target and actual amounts are first calculated. Then the percentage differences in the actual-minus-target columns are calculated by simply subtracting the target percentage from the actual percentage.

As the percentage changes for steps 1 through 3 are reviewed, it should be noted that the couple's revised target gross income, income taxes, and after-tax income increased by 4%, while the actual amounts for the same three steps increased by 3%. Since their entire budget is not variable, target living costs did not increase 4%, but experienced the actual increases incurred. Target and actual savings were calculated by subtracting the amounts in step 4 from those in step 3.

The differences between the couple's actual amounts and the targets set show the extent to which the couple was, or was not, able to meet their goals for the year in each of the five steps in model 10. It should be noted that the couple's objective was to keep pace with inflation. In this example, the couple's Actual Living Costs (step 4) were higher than they had projected and their savings fell short of their targeted amount because a higher than expected inflation rate coupled with their after-tax income not keeping pace with inflation, which eroded the couple's ability to simultaneously save at their target level while maintaining their current standard of living.

At the beginning of each new year, after one has changed the projected target amounts to revised target amounts, inserted the actual results, and calculated the difference, they are ready to project the next five-year period. In this example, one would be projecting the next five-year period from 1997 to 2001. This would involve using 1996 actual figures for all five steps as the base amounts and choosing a new growth rate.

Comparing Actual to Revised Target Amounts

The couple's goal was to keep pace with inflation. If their actual amounts of gross income, after-tax income, and savings (steps 1, 3, and 5) were to exceed their revised target amounts, it would be because their after-tax income had outpaced inflation. But, as the example of the couple clearly demonstrates, their actual amounts are less than their revised target amounts. Therefore, their after-tax income is not keeping pace with inflation. It should be noted that method 20 functions in three modes whether for an inflationary environment or a deflationary environment: (1) controlling costs when after-tax income is not keeping pace with inflation or deflation (after-tax income is declining more than deflation in the latter); (2) keeping pace with inflation or deflation; or (3) outpacing inflation or deflation.

As a result, when setting and comparing target amounts with actual results, one must always consider the mode in which they are operating method 20. Regarding income taxes and living costs, steps 2 and 4, the first point to note is that these are subtraction steps. That is, income taxes are subtracted from gross income to arrive at after-tax income, and living costs are subtracted from after-tax income to arrive at savings. When comparing these steps, because they are subtraction steps, the thinking should be the reverse of that in comparing steps 1, 3, and 5. That means that the goal here is to have actual amounts for income taxes and living costs be less than target amounts. The primary reason for comparing actual to target amounts for income taxes and living costs (steps 2 and 4) is to be able to pinpoint the differences arising in after-tax income and savings (steps 3 and 5).

Steps for Using the Profile

At this point it might be helpful to review the procedures for using the five-step economic model profile 20. To begin, the actual base year figures for gross income, income taxes, after-tax income, living costs, and savings must be inserted into the profile. It must be noted that the base year is the year prior to the first year of the profile, and the base amounts are the actual amounts for that year. The following steps explain the process for inserting the base year actual amounts.

Step 1: Base Year Actual Gross Income:

In general, the actual gross income in the base year will be the total of all items of recurring gross income from Form 1040 (the U.S. individual tax return) or from the shorter forms, 1040-A or 1040 EZ, depending on which are used. Recurring items are items of gross income that are expected to continue in subsequent years, rather than income items that arise from a one-time event such as lottery winnings. It should be noted that the profile can be used for projecting single incomes or combined incomes. In this example, the combined incomes of a married couple with no children are being illustrated.

Step 2: Base Year Actual Income Taxes:

The actual total income taxes in the base year are calculated by adding actual federal, FICA, state, local, and any other income-based taxes (the existence of state and local taxes depending on the laws of each state).

Step 3: Base Year Actual After-Tax Income:

Actual after-tax income in the base year is calculated by subtracting total actual income taxes from actual gross income.

Step 4: Base Year Actual Living Costs:

The actual living costs in the base year are determined by adding together actual living costs.

Step 5: Base Year Actual Savings:

Actual savings in the base year is the amount of actual after-tax income not spent on actual living costs (step 3, step 4).

Living Costs

The user of the method 20 must carefully examine living costs in the base year. Once the user is satisfied that the living cost components will be included in the following year, they should increase the variable living cost components by a projected growth rate. The fixed-cost components are then added to the inflation-adjusted variable components.

If there are any changes that would alter living cost components, and therefore affect savings amounts in the base year, this is the point at which such changes should be made. For instance, if a household incurred large living cost expenses in a particular year because of heavy credit card spending, then this excess spending should not be projected forward. Rather, the household should attempt to lower living costs so that they are more in line with prior years before projecting target amounts.

It is recommended that a detailed budget for living costs be constructed using the seven product groups of the CPI as a guide. This budget is to be used for both target and actual amounts, adding the necessary detail for the living cost components (step 4) to identify differences between actual and target amounts. Table 14 is an example of an actual-versus-target budget for living costs for the married couple with no children using 1995 base year actual amounts; revised 1996 target amounts calculated with the revised inflation rate of 4% instead of the projected rate of 2.5%; 1996 actual amounts; and the differences. Table 14 provides the detail for the actual and target living cost totals which appear in step 4 of Table 13.

TABLE 14

Actual minus Target Budget for Living Costs

|  | 1995 Actual Living Costs | 1996 Actual Living Costs | 1996 Target Living Costs (Revised at 4%) | 1996 Actual minus Target |
|---|---|---|---|---|
| Food and Beverages | $ 4,501 | $ 4,704 | $ 4,681 | $ 23 |
| Food |  |  |  |  |
| Housing |  |  |  |  |
| Mortgage | $ 6,046 | $ 6,046 | $ 6,046 | $ 0 |
| Real Estate Taxes | 2,800 | 2,898 | 2,912 | −14 |
| Utilities/Household Expenses | 1,850 | 1,915 | 1,924 | −9 |
| Homeowner's Insurance | 725 | 754 | 754 | 0 |
| Subtotal | $ 11,421 | $ 11,613 | $ 11,636 | −$ 23 |
| Apparel and Upkeep | $ 1,589 | $ 1,661 | $ 1,653 | $ 8 |
| Clothing |  |  |  |  |
| Transportation |  |  |  |  |
| Auto Loans | $ 2,450 | $ 2,450 | $ 2,450 | $ 0 |
| Car Insurance | 875 | 914 | 910 | 4 |
| Gasoline and Repairs | 901 | 942 | 937 | 5 |

TABLE 14-continued

Actual minus Target Budget for Living Costs

|  | 1995 Actual Living Costs | 1996 Actual Living Costs | 1996 Target Living Costs (Revised at 4%) | 1996 Actual minus Target |
|---|---|---|---|---|
| Public Transportation |  275 |  286 |  286 |  0 |
| Subtotal | $ 4,501 | $ 4,592 | $ 4,583 | $ 9 |
| Medical Care |  |  |  |  |
| Medical Costs/Insurance | $ 1,194 | $ 1,236 | $ 1,242 | −$ 6 |
| Dental/Eye Examinations | 475 | 492 | 494 | −2 |
| Prescription Drugs | 185 | 191 | 192 | −1 |
| Subtotal | $ 1,854 | $ 1,919 | $ 1,928 | −$ 9 |
| Entertainment |  |  |  |  |
| Vacations | $ 559 | $ 584 | $ 581 | $ 3 |
| Fitness Programs | 375 | 392 | 390 | 2 |
| Video Rentals | 125 | 131 | 130 | 1 |
| Subtotal | $ 1,059 | $ 1,107 | $ 1,101 | $ 6 |
| Other Goods and Services |  |  |  |  |
| Life Insurance | $ 500 | $ 520 | $ 520 | $ 0 |
| Credit Card Debt | 50 | 50 | 50 | 0 |
| Charitable Giving | 125 | 130 | 130 | 0 |
| Personal Care Items | 879 | 914 | 914 | 0 |
| Subtotal | $ 1,554 | $ 1,614 | $ 1,614 | $ 0 |
| Total Living Costs | $ 26,479 | $ 27,210 | $ 27,196 | $ 14 |

A budget for living costs on either a monthly or annual basis can be constructed using a checkbook register and credit card statements (our example is an annual budget). This detailed budget will enable one to make a clear analysis of their actual and target living costs. As the sample budget is reviewed, it should be noted that the couple's actual living costs in some cases are more than, equal to, or less than the target amounts. Also it should be noted that their mortgage payment, auto loan payment, and credit card payment remain fixed each year.

Generally, the one variable that can be controlled in a financial plan is expenses. Therefore, one should scrutinize living costs carefully, regardless of which scenario the profile projects: keeping pace with inflation or deflation, outpacing inflation or deflation, or lagging behind inflation or deflation. Furthermore, it is up to the user of method 20 to determine the assumptions to make about increases in living costs in order to arrive at the desired amount of savings.

Managerial Approach To Using Method 20

Once the user of method 20 provided by the present invention becomes proficient at establishing target amounts based on the mode in which t(inflationary the method (inflationary or deflationary) and revising target amounts at year end (basing the revision on the actual rate of inflation or deflation) they will find out how inflation (or deflation) affects their own personal financial plan. Depending on their composition of fixed and variable living costs, standard of living, stage in the life cycle, independent changes (i.e., birth of a child, purchase of a home), level of inflation (deflation) and their own buying patterns, users of the method will begin to gain knowledge of how their living costs change (increase or decrease) from year to year relative to the actual rate of inflation or deflation as reported by the CPI.

Users will find that some living cost categories increase (decrease) at the same rate as inflation (deflation), some increase (decrease) more and some less—while fixed components do not change at all. As a result, over time, users of the method will be able to determine their own personalized rate of inflation (deflation) relative to the actual CPI reading. That is, they may run a certain percentage above or below the CPI reading. Once this percentage increase (or decrease) is determined, the user's personal inflation (deflation) rate could be used to project income that would keep pace with, outpace or lag their personal rate of inflation (deflation). In other words, a family or individual may find that they run on average 1% more or 1% less than the CPI. Therefore, they would estimate 1% above or 1% below estimated CPI to calculate targets. Then when the actual CPI is released they would revise based on 1% more or 1% less than the CPI reading.

This approach would work using the method in exactly the same way as described when using the actual rate of inflation or deflation. However, now the user has determined the actual rate of increase or decrease needed based on the mode in which they are running the method and their personalized rate of inflation. This would lead to projecting personal real increases or decreases, or simply keeping pace with one's personal rate of inflation (deflation). This would be termed a "managerial approach to using the method" and would become more exact with practice and experience. The method would be used to determine the annual increase or decrease in all five steps of model 10 relative to CPI inflation or deflation from year to year along with the percentage allocations of gross income for all five steps. This would provide for accurate percentage monitoring.

Examining Base Amounts Each Year

Once the user knows how to project target amounts, revise target amounts, enter actual amounts into the economic profile, and calculate the differences for all five steps of the profile, they know how to use method 20. However, it is suggested that the user exercise caution before using each year's actual amounts as the base amounts from which to project target amounts.

For instance, one might, in any given year, have an extraordinary event take place that has a dramatic impact on their actual results for that year. One could get a large raise in one year and lose their job the next year. Or living costs could rise because of the arrival of a child, the purchase of a home, or the payment of children's college costs.

When using this method 20, therefore, one should not simply "plug in" numbers and then multiply them by a projected growth rate; rather, one should thoroughly analyze all of the components of their financial plan. Once they are satisfied that the base year amounts reflect what they can reasonably expect the following year, the next step is to adjust for inflation. Then, at the end of the year, one must change the projected target amounts to revised target amounts, if necessary, enter the actual amounts into the profile, and calculate the differences.

Projecting Ahead

The five year, five step economic model can be used to meet savings goals. Once it has been determined how much to save, one can then decide how to go about generating those savings dollars. That is where the five year, five-step economic model profile will be a great help. While it is easy to calculate the amount of money needed to reach a financial goal, it is difficult to actually save for that goal. Looking again at our hypothetical married couple with no children, Table 12 (please refer back) indicated how much savings our couple could accumulate during the five-year period from 1996 to 2000 if they met the targets they set. According to our calculations in Table 12, our married couple's projected savings would be $28,484 ($5,002+$5,340+$5,687+$6,044+$6,411).

Method 20, therefore, has several advantages:

(1) The first and foremost advantage is that the five year, five-step economic model profile represents the first introduced standard model for personal financial planning to be used in an inflationary or deflationary economic environment—the goal of which is to promote savings. Up to this point a model has not been created that would set the standard for personal financial planning—tieing together all the essential elements of a financial plan. Model 10 will now be available to teach sound financial planning to every individual desirous of such information—tieing together gross income, income taxes, after-tax income, living costs and savings all into one systematic learning model.

(2) Method 20 can work for anyone at any stage of life. The necessary calculations to use the method 20 are easy to do. In fact, the method 20 requires only that the user be able to add, subtract, multiply, and divide. Also, these calculations can easily be performed on a calculator. The computer system provided by the present invention, in which model 10 and profile 20 are implemented, further simplifies the process.

(3) Because the five year, five-step economic model profile contains all the information on gross income, income taxes, after-tax income, living costs, and savings, users can immediately see all the components of their financial plan. The easy-to-understand format enables them to react quickly to differences between actual and targeted amounts. Furthermore, the flow of the profile tracks how money is actually earned and spent—that is, gross income minus income taxes equals after-tax income, and after-tax income minus living costs equals savings.

(4) The five year, five-step economic model profile allows users to adjust annually for the effects of inflation (or deflation) and generate income goals and savings rates needed to accomplish financial goals. Many individuals are so focused on the investment aspect of a financial plan that they forget about the earnings side of the equation. If earnings (gross income) does not keep pace with living costs as measured by inflation, then savings will eventually decline. If savings decline, there will be less money to invest to reach financial goals.

(5) The concept of comparing actual amounts to target (budgeted) amounts is the procedure corporate America uses to design annual business plans. This same process is at work in the five year, five-step economic model profile for financial planning.

(6) Because the profile works with both dollar and percentage amounts, users can readily determine how much additional gross income they need to arrive at a certain after-tax income amount. For instance, if one would need an additional $5,000 of after-tax income in a specific year and knew that after-tax income is 78 percent of gross income, they could simply divide $5,000 by 0.78, which equals $6,410. This $6,410 is the amount of gross income one would need—assuming tax rates do not change—to produce $5,000 of after-tax income. Similarly, if one wanted to increase savings, model 10 provides all the tools to determine how to attain that goal: to increase income, lower living costs, or both.

(7) Indexing of the federal tax system, which began in 1989, now allows for increases in gross income no greater than the rate of inflation to be taxed at the same federal tax rate. Prior to indexing there was no adjustment in the federal tax system. As a result, a tax payer could have been penalized by paying a higher federal income tax rate on a portion of their income in a given year even though their income was simply increasing commensurately with inflation. This would result in less after-tax income with which to meet escalating living costs—not allowing the entire percent increase in gross income to flow through in tact to after tax income. Other income taxes include FICA taxes, and state and local taxes. FICA taxes are not indexed, but are proportionate, accomplishing the same goal as indexing. Some state income tax systems share in the indexing performed at the federal level, to the extent their tax returns begin with federal taxable income (sharing in the adjustments made to the personal exemption and standard deduction amounts), and local taxes are not indexed. The extent to which local taxes are proportionate, however, determines the amount of increase in gross income flowing through to after-tax income.

(8) Savings, which is the goal of the five-step economic model profile 20, can be used to meet the primary goals of a financial plan which are:

a) To build an emergency fund;

b) To accumulate a home down payment;

c) To provide for college costs for children;

d) To save for retirement; and e) To meet planned expenditures.

Once the future cost (fv) of a financial goal is determined, the annual amount of savings needed can be easily determined using financial calculations involving time (n), interest rate (i), payment information (pmt) and present savings (pv) information. It can be stated that increased savings on a national level will provide needed funds for economic growth—the opportunity for an expanding economy, controlled inflation and lower unemployment.

Two additional schedules that can be used along with the five-step economic model profile 20 to provide added detail for information concerning income taxes are examined below.

TABLE 15

The Target Income Tax Schedule

| A Year | B Target Gross Income | C Target Federal Tax Due | D Target Federal Tax Rate | E Target FICA Tax Due | F Target FICA Tax Rate | G Target State Tax Due | H Target State Tax Rate | I Target Local Tax Due | J Target Local Tax Rate | K Target Total Tax Due | L Target Income Tax Rate |
|---|---|---|---|---|---|---|---|---|---|---|---|
| 1995 | $40,000 | $4,268 | 10.67% | $3,060 | 7.65% | $1,120 | 2.80% | $400 | 1.00% | $8,848 | 22.12% |
| 1996 | $41,000 | $4,375 | 10.67% | $3,137 | 7.65% | $1,148 | 2.80% | $410 | 1.00% | $9,069 | 22.12% |
| 1997 | $42,025 | $4,484 | 10.67% | $3,215 | 7.65% | $1,177 | 2.80% | $420 | 1.00% | $9,296 | 22.12% |
| 1998 | $43,076 | $4,596 | 10.67% | $3,295 | 7.65% | $1,206 | 2.80% | $431 | 1.00% | $9,528 | 22.12% |
| 1999 | $44,153 | $4,711 | 10.67% | $3,378 | 7.65% | $1,236 | 2.80% | $442 | 1.00% | $9,767 | 22.12% |
| 2000 | $45,256 | $4,829 | 10.67% | $3,462 | 7.65% | $1,267 | 2.80% | $453 | 1.00% | $10,011 | 22.12% |

The target income tax schedule (Table 15) is an exhibit that lists all information relative to target income taxes. Because the five-step economic model profile 20 works on the basis of comparing actual amounts to target amounts, detail for income taxes is provided by a target and actual income tax schedule (2 supporting schedules in total) to account for step 2 (income taxes) of the five year, five-step economic model profile.

The target income tax schedule begins with the years in Column A. It then lists target gross income in Column B for the same time period covered in the five year, five-step economic model profile presented earlier—1995 through 2000—using a 2.50% inflation rate—the same rate applied to target income taxes in the profile. The base year of 1995 will still be used to establish the targeted amounts. The schedule then lists the federal, FICA, state and local income taxes for the base year 1995 in Columns C, E, G and I. It should be noted that this schedule can be expanded to include other income based taxes or reduced to include only federal and FICA taxes, should that be the case.

The 1995 income tax amounts in Columns C, E, G and I are then divided by target gross income which is listed in Column B. This is done in order to determine the tax rate for each type of individual income tax as a percentage of target gross income. Even though each tax is calculated individually, each of the individual income tax rates in Columns D, F, H and J and the aggregate tax rate in Column L are expressed as a percentage amount of gross income when using the target income tax schedule.

Referring to Columns B through D, 1995 target gross income is $40,000. The federal tax due is $4,268 based on a 15% tax rate. The $4,268 is then divided by $40,000 (target gross income) and then multiplied by 100 to arrive at the target federal tax rate of 10.67% (as a percentage of target gross income). This same format is followed for each type of income tax due in Columns E and F, G and H and I and J. The target total tax due and the target income tax rate is then listed in Columns K and L.

In Column K the total 1995 income tax due is indicated of $8,848. This is determined by cross adding Column C (federal tax due), Column E (FICA tax due), Column G (state tax due) and Column I (local tax due) which totals 8,848. Dividing $8,848, which represents the total income taxes due for 1995 (Column K), by target gross income of $40,000 (Column B) and then multiplying by 100 yields the target income tax rate of 22.12% (Column L).

Because income taxes remain constant in percentage terms during the period 1996 through 2000 (see Columns D, F, H, J and L) the flow through concept is in operation allowing the 2.50% increase in gross income to flow through to after-tax income. Even though the percentage tax rates are constant in Columns D, F, H, J and L, in dollar terms the target total tax due (Column K) and the individual tax amounts (Columns C, E, G, and I) increase as target gross income increases (Column B).

To use the target income tax schedule, once the base year target tax amounts (which are the actual 1995 tax figures in the example) are inserted into the target income tax schedule, it is necessary only to increase them by the same rate of inflation (deflation) used in the five-step economic model profile. This will cause the individual tax figures columns C, E, G and I) and the aggregate tax figure (Column L) to increase at the same rate as target gross income. This will allow income taxes to remain constant in percentages terms so that increases in target gross income can flow through to target after-tax income. It should be noted that if the five year, five step economic model is revised based on a different actual inflation rate than originally projected for the year just ended, then this schedule would also need to be revised.

TABLE 16

The Actual Income Tax Schedule

| A Year | B Actual Gross Income | C Actual Federal Tax Due | D Actual Federal Tax Rate | E Actual FICA Tax Due | F Actual FICA Tax Rate | G Actual State Tax Due | H Actual State Tax Rate | I Actual Local Tax Due | J Actual Local Tax Rate | K Actual Total Tax Due | L Actual Income Tax Rate |
|---|---|---|---|---|---|---|---|---|---|---|---|
| 1995 | $40,000 | $4,268 | 10.67% | $3,060 | 7.65% | $1,120 | 2.80% | $400 | 1.00% | $8,848 | 22.12% |
| 1996 | $41,200 | $4,396 | 10.67% | $3,152 | 7.65% | $1,154 | 2.80% | $412 | 1.00% | $9,113 | 22.12% |
| 1997 | | | | | | | | | | | |
| 1998 | | | | | | | | | | | |
| 1999 | | | | | | | | | | | |
| 2000 | | | | | | | | | | | |

The actual income tax schedule (Table 16) has the exact same structure as the target income tax schedule. It begins on the base year (1995) with the same amounts as the target income tax schedule. The 1996 amounts are the amounts actually incurred—presented earlier.

As variances arise in the five year, five step economic model profile between target after-tax income and actual after-tax income one will be able to refer to the target and actual income tax schedules to pinpoint the reasons for these variances. Tables 16, as with Table 15, can be expanded to account for other income based taxes by using the same format and simply expanding the number of columns or it can be reduced.

Computer program product 200, which will be described below is loaded into computer 110, and run just as any application program would be run. Information needed by program 200 can be input through keyboard 130 by the user pursuant to prompts that appear on display 120, or, in the case primarily of the actual amounts, they can be supplied by commercially-available financial planning software.

FIGS. 9A through 9E constitutes a flow chart representation of the computer program 200 of system 100. Flow diagram 210 illustrates generally the use of system 100 and program 200. In Stage 1 of diagram 210, the user determines the level of savings required to meet their financial goals based on the types of investments selected and their

TABLE 17

Living Costs 1995–2000

|  | 1995 Actual Living Costs | 1996 Target Living Costs | 1997 Target Living Costs | 1998 Target Living Costs | 1999 Target Living Costs | 2000 Target Living Costs |
|---|---|---|---|---|---|---|
| Food and Beverages | $ 4,501 | $ 4,614 | $ 4,729 | $ 4,847 | $ 4,968 | $ 5,092 |
| Food |  |  |  |  |  |  |
| Housing |  |  |  |  |  |  |
| Mortgage | $ 6,046 | $ 6,046 | $ 6,046 | $ 6,046 | $ 6,046 | $ 6,046 |
| Real Estate Taxes | 2,800 | 2,870 | 2,942 | 3,016 | 3,091 | 3,168 |
| Utilities/Household Expenses | 1,850 | 1,896 | 1,943 | 1,922 | 2,042 | 2,093 |
| Homeowner's Insurance | 725 | 743 | 762 | 781 | 801 | 821 |
| Subtotal | $ 11,421 | $ 11,555 | $ 11,693 | $ 11,835 | $ 11,980 | $ 12,128 |
| Apparel and Upkeep | $ 1,589 | $ 1,629 | $ 1,670 | $ 1,712 | $ 1,755 | $ 1,799 |
| Clothing |  |  |  |  |  |  |
| Transportation |  |  |  |  |  |  |
| Auto Loans | $ 2,450 | $ 2,450 | $ 2,450 | $ 2,450 | $ 2,450 | $ 2,450 |
| Car Insurance | 875 | 897 | 919 | 942 | 966 | 990 |
| Gasoline and Repairs | 901 | 924 | 947 | 971 | 995 | 1,020 |
| Public Transportation | 275 | 282 | 289 | 296 | 303 | 311 |
| Subtotal | $ 4,501 | $ 4,553 | $ 4,605 | $ 4,659 | $ 4,714 | $ 4,771 |
| Medical Care |  |  |  |  |  |  |
| Medical Costs/Insurance | $ 1,194 | $ 1,224 | $ 1,255 | $ 1,286 | $ 1,318 | $ 1,351 |
| Dental/Eye Examinations | 475 | 487 | 499 | 511 | 524 | 537 |
| Prescription Drugs | 185 | 190 | 195 | 200 | 205 | 210 |
| Subtotal | $ 1,854 | $ 1,901 | $ 1,949 | $ 1,997 | $ 2,047 | $ 2,098 |
| Entertainment |  |  |  |  |  |  |
| Vacations | $ 559 | $ 573 | $ 587 | $ 602 | $ 617 | $ 632 |
| Fitness Programs | 375 | 384 | 394 | 404 | 414 | 424 |
| Video Rentals | 125 | 128 | 131 | 134 | 137 | 140 |
| Subtotal | $ 1,059 | $ 1,085 | $ 1,112 | $ 1,140 | $ 1,168 | $ 1,196 |
| Other Goods and Services |  |  |  |  |  |  |
| Life Insurance | $ 500 | $ 513 | $ 526 | $ 539 | $ 552 | $ 566 |
| Credit Card Debt | 50 | 50 | 50 | 50 | 50 | 50 |
| Charitable Giving | 125 | 128 | 131 | 134 | 137 | 140 |
| Personal Care Items | 879 | 901 | 924 | 947 | 971 | 995 |
| Subtotal | $ 1,554 | $ 1,592 | $ 1,631 | $ 1,670 | $ 1,710 | $ 1,751 |
| Total Living Costs | $ 26,479 | $ 26,929 | $ 27,389 | $ 27,860 | $ 28,342 | $ 28,835 |

Figure 8:
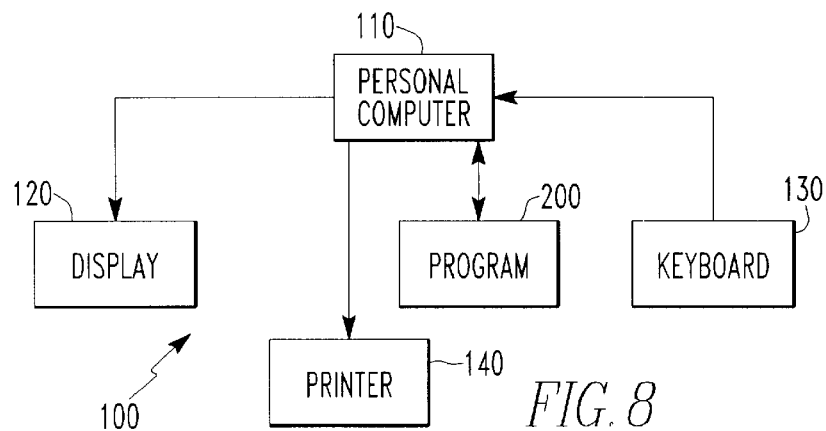
FIG. 8 shows in block diagram form the preferred system provided by the present invention.
Figure 9A:
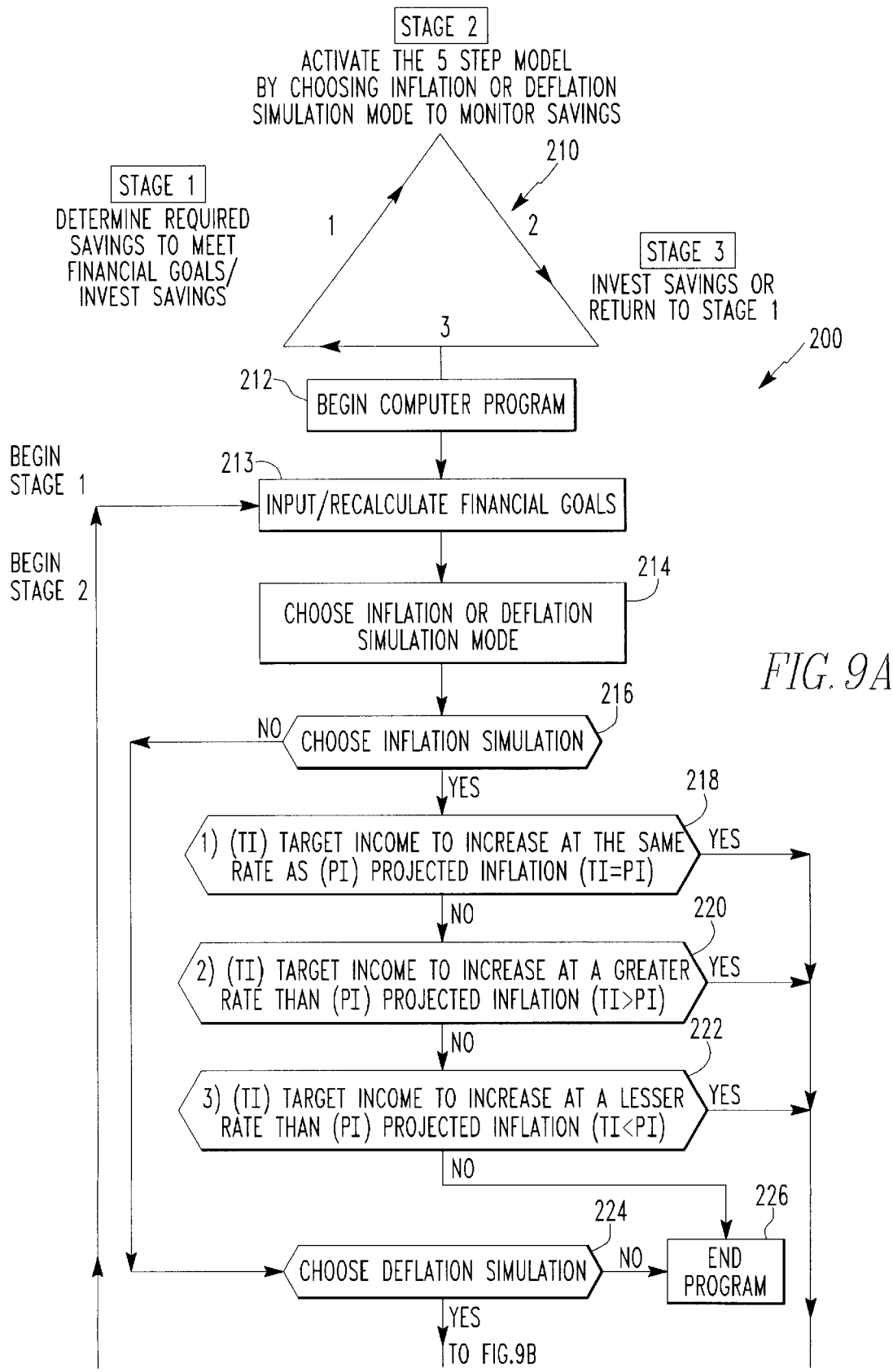
FIG. 9 is a flow chart of the preferred computer program product provided by the present invention.
Figure 9B:
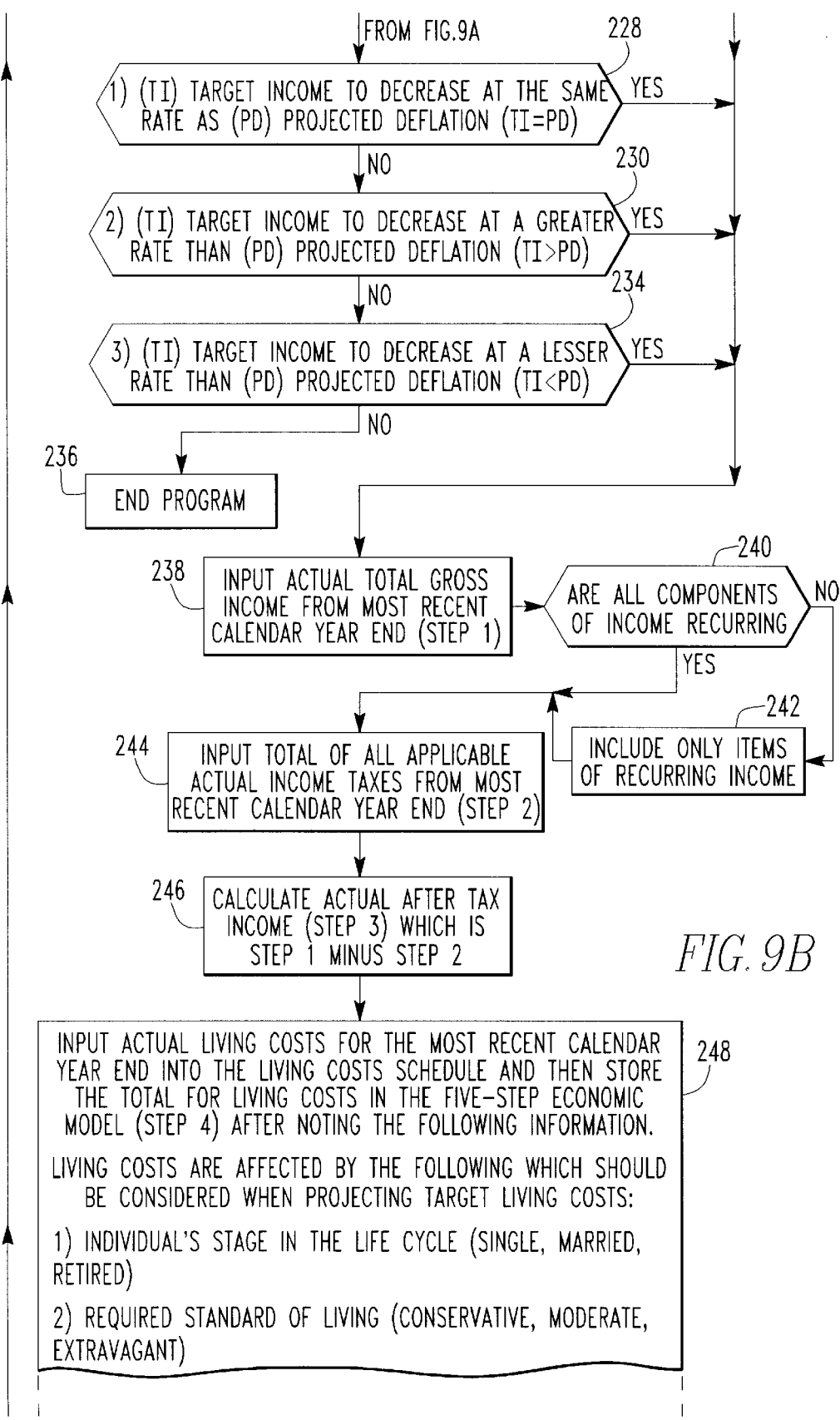
Figure 9C:
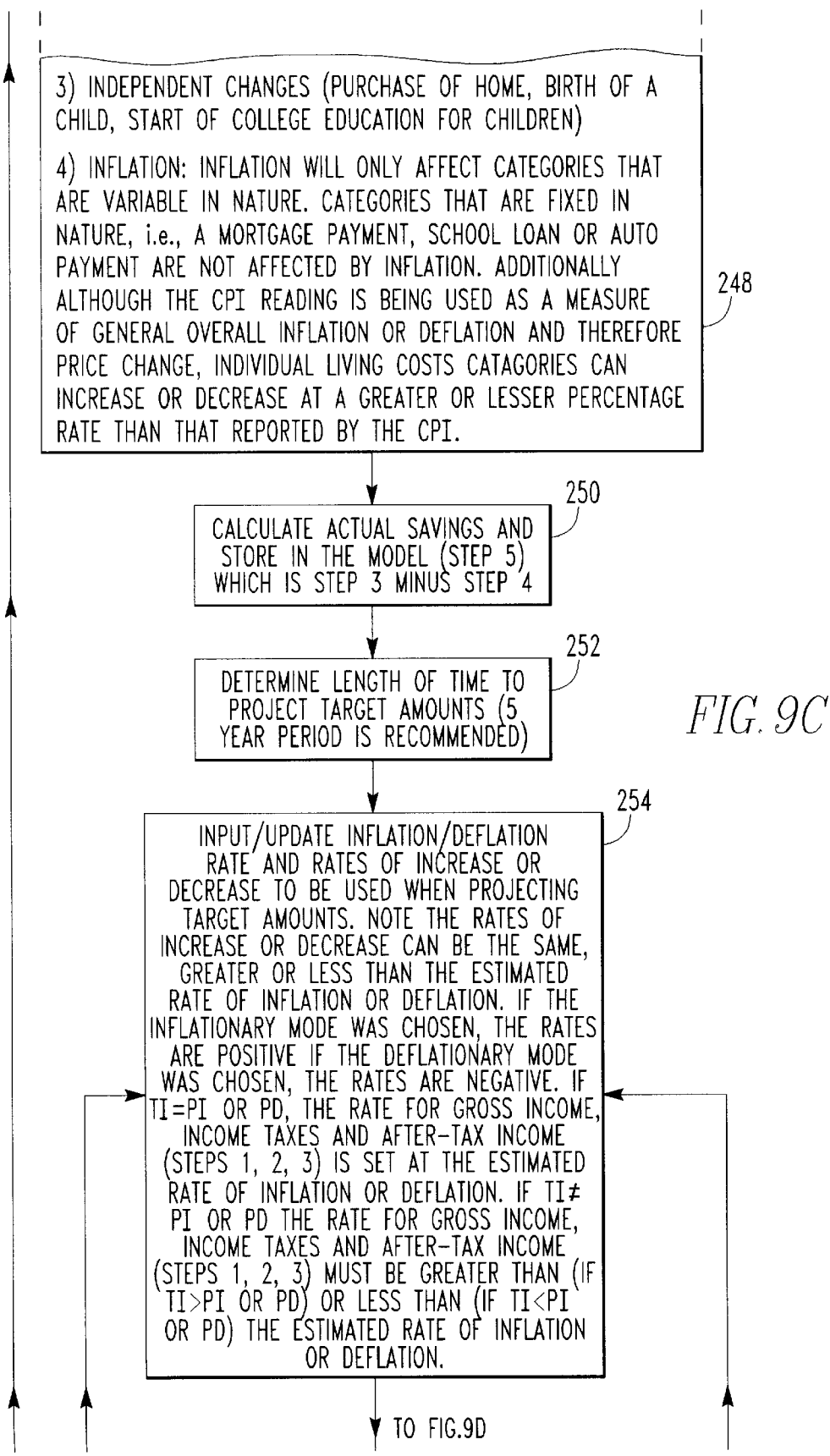
Figure 9D:
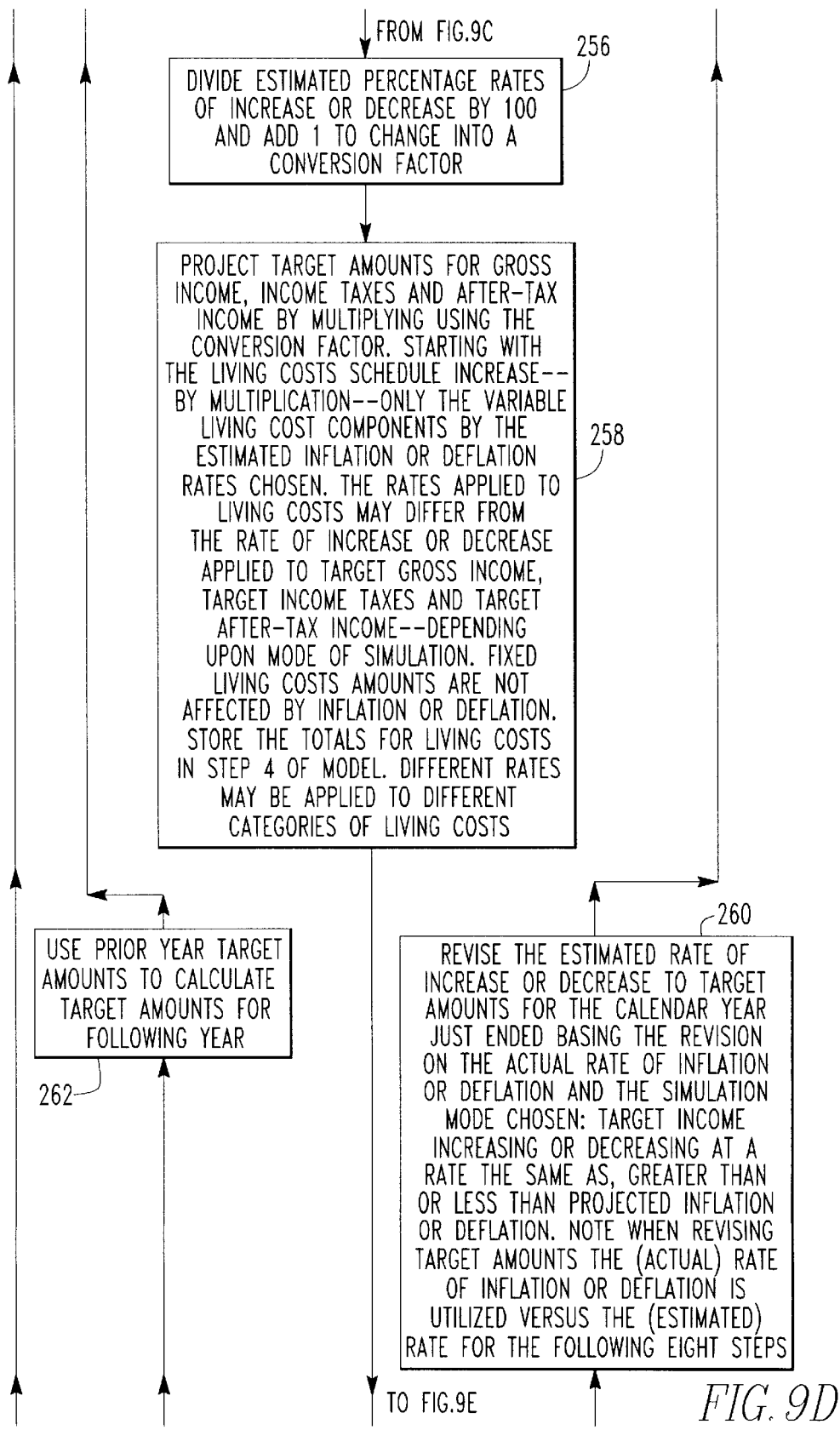
Figure 9E:
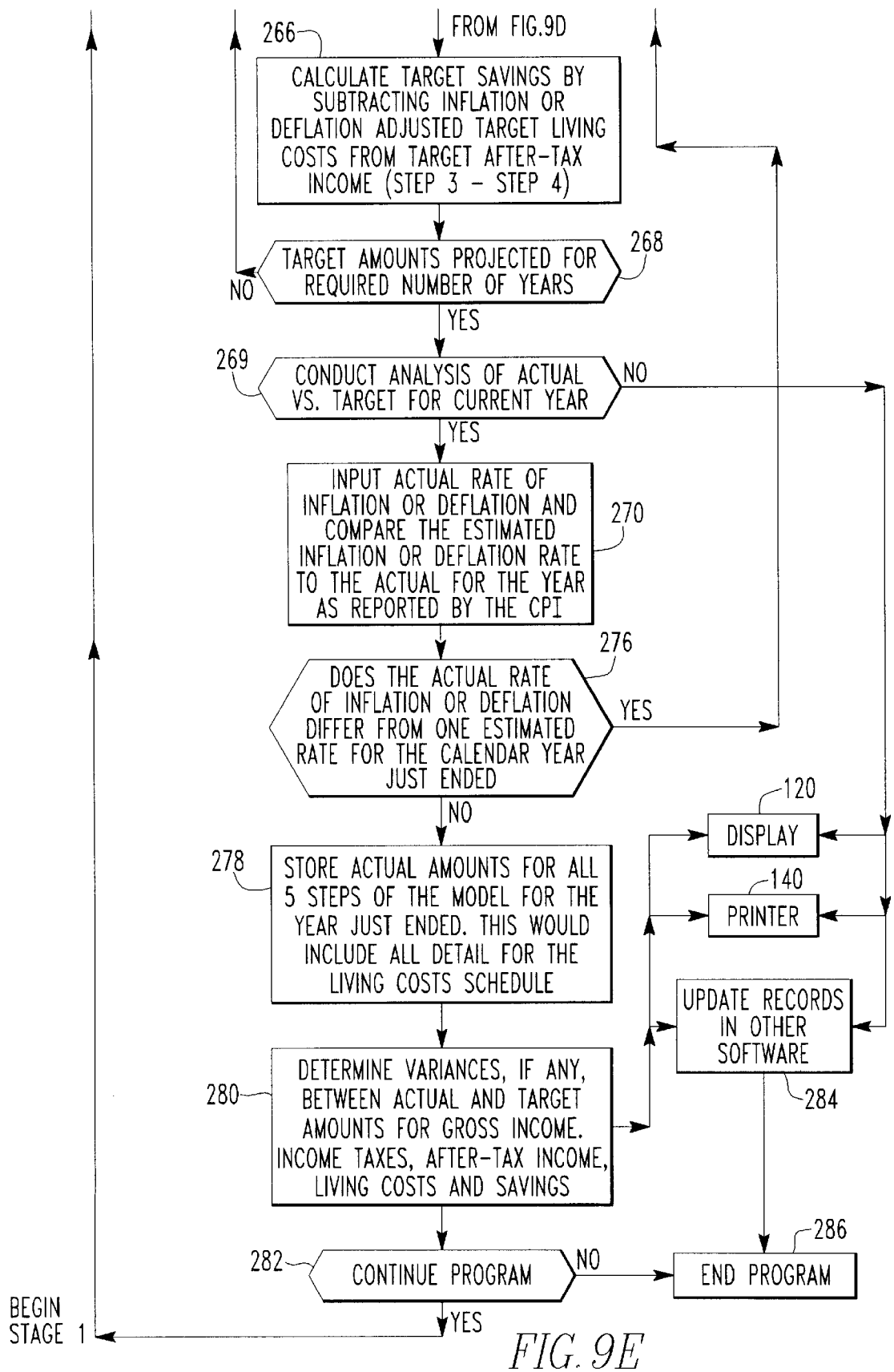
Figure 10:
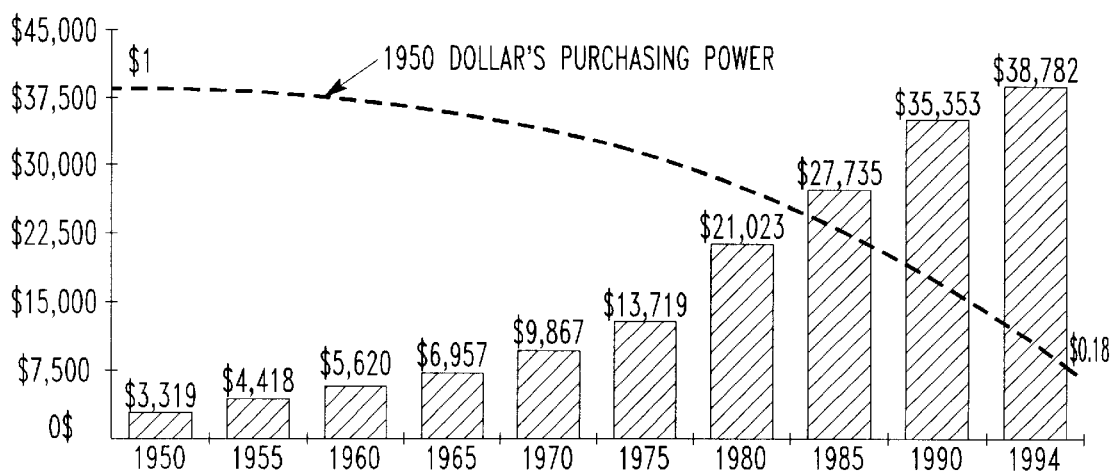
FIG. 10 is a chart showing increasing incomes and declining purchasing power of the United States Dollar for selected years during the period 1950 through 1994.
Figure 11:
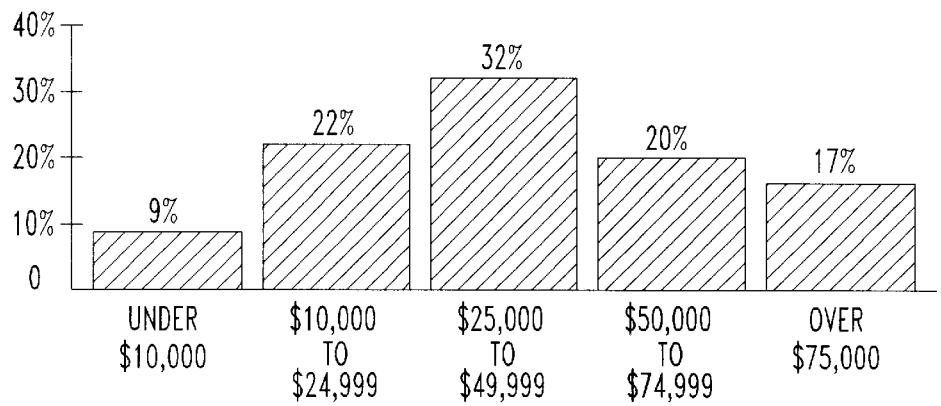
FIG. 11 is a chart showing family income ranges for 1994.
Figure 12:
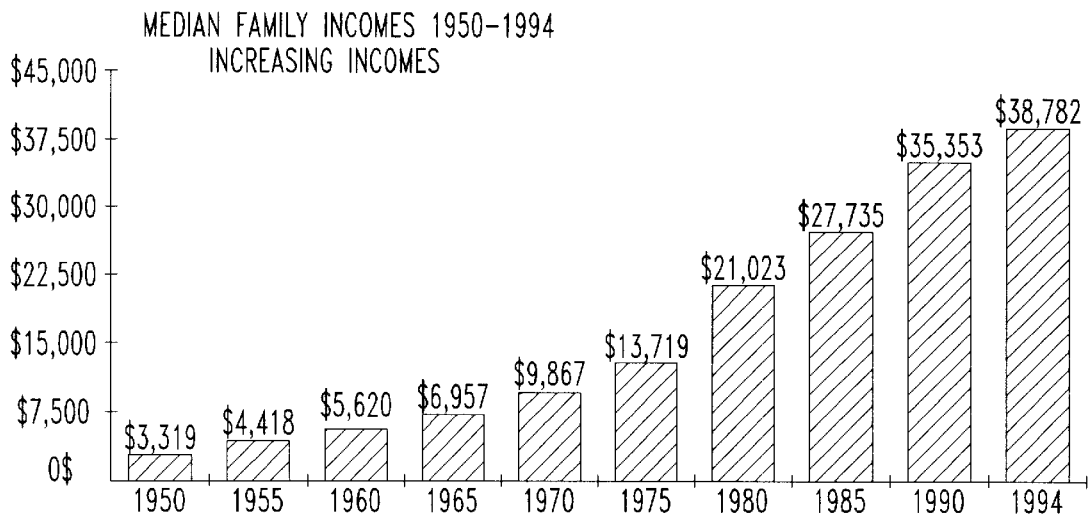
FIG. 12 is a chart showing median family income for selected years during the period 1950 through 1994.
Figure 13:
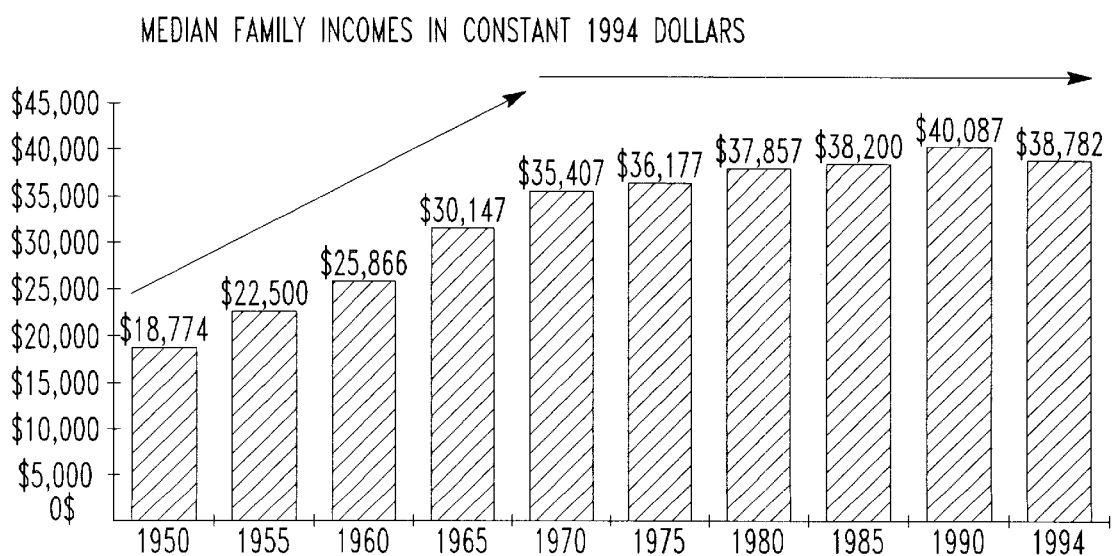
FIG. 13 is a chart showing median family incomes for selected years during the period 1950 through 1994 in constant 1994 dollars.

FIG. 8 shows the preferred computer system 100 provided by the present invention, which incorporates method or profile 20. System 100 includes a personal computer 110, monitor or display 120, keyboard or other data entry device 130, and printer 140. Because computer 110 is a standard personal computer, it is not described in detail herein. Computer 110 has a processor, and memory, including read only memory, that can contain both program 200 and the information that is used and produced by program 200.

expected investment returns. This level may be determined in any number of ways. The user may determine the savings and investments as needed without any aid, or they may work with a financial planner. Alternately, the user may use any of the commercially available software packages. In any event, the savings and investment goal levels are inputs to system 100. Next, in Stage 2, system 100 is used to analyze and control the savings level. Finally, all or part of the savings is invested in any variety of investments.

Program 200 can be created easily from the flow chart of FIG. 9, and can be any suitable program that performs the functions described in FIG. 9.

The user begins using program 200 at block 212 by causing program 200 to begin running on general purpose computer 110. Inputs to program 200 can be made through keyboard 130 of system 100, or they can be received from other commercially available financial planning software, as desired. Outputs can be produced at display 120 or printer 140, or they can be used to update computer files maintained by commercially-available investment software.

The savings level that was determined prior to running program 200 is input to program 200 at block 212. At block 213, the user inputs information that informs program 200 whether the user wishes to target income to increase or decrease at a rate that is greater or lesser than the projected rate of inflation or deflation, or whether income will be targeted to increase or decrease at the same rate as the projected rate of inflation or deflation, and program 200 sets a "target income flag" accordingly (the terms "projected" and "estimated" as they pertain to inflation and deflation rates and rates based on the rate of inflation or deflation being used interchangably). The user chooses at block 214 either the inflation or deflation mode, and program 200 sets a "mode flag" accordingly. Program 200 checks the "mode flag" at block 216 to determine whether the inflation or deflation mode was chosen by the user. If the inflation mode was chosen, processing passes to block 218. Otherwise, processing passes to block 224. At block 218, which is reached as a consequence of the user choosing the inflationary mode at block 214, program 200 checks the "target income flag" to determine whether the user wishes to target income to increase at the same rate as projected inflation. If so, processing passes to block 238, where program 200 begins to implement profile 20. Otherwise, processing passes to block 220. At block 220, program 200 checks the "target income flag" to determine whether the user wishes to target income to increase at a greater rate than the projected inflation rate. If so, processing proceeds to block 238. Otherwise, processing proceeds to block 222. At block 222, program 200 checks the "target income flag" to determine whether the user wishes to target income to increase at a lesser rate than the projected inflation rate. If so, processing passes to block 238. Otherwise, processing is ended at block 226, since the user has not properly designated one of the three scenarios for the inflationary mode.

At block 224, program 200 checks the "target income flag" to determine whether the user has chosen the deflationary mode. If so, processing passes to block 228. Otherwise, processing ends at block 226, since the user has not chosen either the inflationary or deflationary modes, which are the only two legitimate modes for processing. At block 228, which is reached as a consequence of the user choosing the deflationary mode at block 214, program 200 checks the "target income flag" to determine whether the user wishes target income to decrease at the same rate as the projected deflation rate. If so, processing passes to block 238. Otherwise, processing passes to block 230. At block 230, program 200 checks the "target income flag" to determine whether the user wishes to target income to decrease at a greater rate than the projected rate of deflation. If so, processing passes to block 238. Otherwise, processing passes to block 234. At block 234, program 200 checks the "target income flag" to determine whether the user wishes to target income to decrease at a lesser rate than the projected rate of deflation. If so, processing passes to block 238. Otherwise, program 200 is terminated at block 236, since one of the three legitimate scenarios for the deflationary mode has not been chosen by the user.

At block 238, program 200 has determined whether it should use the inflationary or deflationary mode, and whether income should be targeted to increase or decrease at the same, a greater or a lesser rate than the projected rate of inflation or deflation. At block 238, the actual amount of gross income for the most recent calendar year, which will be the year just prior to the first year for which a projection will be run by program 200, is input to program 200. Processing then passes to block 240, where program 200 prompts the user to determine whether all components of income that were entered at block 238 are recurring. If the user indicates to program 200 that all items of income are recurring, processing passes to block 244. Otherwise, processing passes to block 242, where the user modifies the amount of gross income entered at block 238 that does not constitute recurring income.

At block 244, the user enters the total of all the actual applicable income taxes from the most recent calendar year end. At block 246, program 200 calculates the actual after-tax income for the most recent calendar year end, and processing passes to block 248. At block 248, the user inputs the actual living costs for the most recent calendar year end, which program 200 stores in the living cost schedule of program 200. Block 248 also illustrates the considerations that go into determining living costs. Again, these costs can be input to program 200 manually, for example through the computer keyboard, or they can be input by a suitable computer software package that is used by the user for financial planning preparation.

Processing then passes to block 250, which calculates the actual savings for the most recent calendar year end by subtracting the actual living costs from the actual after-tax income calculated by block 246. Processing then passes to block 252, where the user inputs the number of years for which program 200 will project, with five years being recommended.

In block 254, the user inputs the rate of increase or decrease (for the inflationary or deflationary modes, respectively) that will be used to project target amounts. If the inflationary mode was chosen, block 254 ensures that the rates are positive, and displays an error message if they are not. If the deflationary mode was chosen, block 254 ensures that the rates are negative, and displays an error message if they are not. If TI=PD or PI (meaning that the user has targeted income to increase or decrease at the estimated rate of inflation or deflation, the rate that will be applied to gross income, income taxes and after-tax income (steps 1–3 of model 10) is set to the estimated rate of inflation or deflation. If TI does not equal PD or PI, block 254 ensures that the estimated rate for gross income, income taxes and after tax income (steps 1–3 of model 10) that was input, is either greater than or less than the estimated rate of inflation or deflation, depending on whether TI is greater than or less than PD or PI. As has been stated previously, the rate that is input to program 200 at block 254 need not be the same as the estimated rate of inflation or deflation. In fact, it need not be the same for all amounts or categories, although it must be the same for gross income, income taxes and after tax income—in accordance with the flow through concept. Processing then passes to block 256, where each rate that has been input at block 254 is converted to a conversion factor that will be multiplied by its corresponding actual amount (for example, actual gross income).

Processing then passes to block 258, where program 200 multiplies the conversion factors calculated at block 256 by their corresponding actual amounts to achieve the target amounts for gross income, income taxes, after-tax income and living costs using the rates input to program 200 at block 254.

Processing then passes to block 266, where program 200 calculates target savings by subtracting inflation or deflation adjusted target living costs from target after-tax income. Processing then passes to block 268, where program 200 determines whether a projection has been made for each year of the period input by the user at block 252. If so, processing passes to block 269. Otherwise, processing passes to block 262, where program 200 uses the target amounts just calculated to calculate target amounts for the next year. Processing passes to block 254, where the user may enter new rates for the next year to be projected, or use the same rates. Processing then proceeds through blocks 254 through 268, where target amounts for the next year are calculated. When block 268 determines that target amounts have been projected for all years specified by the user in block 252, processing passes to block 269.

At block 269, program 200 prompts the user to enter through keyboard 130 whether a comparison of estimated or projected inflation or deflation rates to an actual rate of inflation or deflation should be conducted. If no, program 200 updates records in other financial software at block 284, and information calculated by program 200 is available for display 120 and printing at printer 140 of system 100, and processing is terminated at block 284. Otherwise, processing passes to block 270. At block 270, the actual rate of inflation or deflation is input to program 200, and program 200 compares the estimated inflation or deflation rate to the actual rate of inflation or deflation.

At block 276, program 200 determines whether the actual rate of inflation differs from the projected rate. If the actual rate does not differ from the projected rate, processing passes to block 278. Otherwise, processing passes to block 260. At block 260, program 200 prompts the user to enter new rate information. Again, this comparison is not limited to the rate of inflation or deflation, and can include any of the rate information that was input by the user at block 254, although the adjustments should be related to the actual rate of inflation or deflation for the current year. At block 254, program 200 revises the rate information that it has stored in the computer memory, and new target amounts are calculated at blocks 258 through 266, for all the years in the projection input by the user in block 252.

At block 278, program 200 stores all actual amounts for the year just ended, including all living cost information. Processing then passes to block 280, where program 200 calculates the variances, if any, between the target amounts and the actual amounts.

At this point, program 200 may display all actual and target amounts for all projected years on display 120, and this information may be printed on printer 140. Additionally, some or all of this information, for example actual and projected savings amounts, may be input either manually or electronically to any suitable investment software package at block 284 Processing then passes to block 282, where the user is prompted to enter through keyboard 130 whether the user wishes to continue the program. If so, processing passes to block 213, where a new analysis is commenced. Otherwise, processing passes to block 286, where processing is terminated.

What is claimed is:

1. A method using a computer for projecting targeted financial amounts, comprising the steps of:

a. said computer identifying in a record actual amounts of gross income, income taxes, after-tax income, living costs and savings for a base period of time;

b. said computer projecting a rate of inflation or deflation for the first period in a group of periods, said projected rate being related to the rate of inflation or deflation for the base period, and entering said projected rate in a record;

c. said computer determining amount rates corresponding to each said amount that will be applied to said amounts to achieve target amounts for each said period, said amount rates being related to said projected rate of inflation or deflation, and entering said amount rates in a record;

d. said computer converting said almost rates to factors by dividing each said amount rate by 100 and adding 1, and entering said converted amount rates into a record;

e. said computer applying each said converted amount rate to its corresponding amount to achieve said target amounts for each said period, and entering said target amounts in a record;

f. said computer determining whether actual rates of inflation or deflation for a said period or partial period justifies redetermining said amount rates to be applied to said actual amounts to achieve said target amounts, and, if so, recalculating target amounts for each said period, and entering said target amounts in a record;

g. said computer determining whether variances exist between targeted amounts and actual amounts for any said period, and displaying said variances; and h. said computer displaying new projected target amounts based on said actual amounts.

2. A computer program product on a computer readable medium for controlling a computer, comprising:

a. said computer program having first logic for storing in a fist record in the computer actual amounts of gross income, income taxes, after-tax income, living costs and savings for a base period of time;

b. said computer program having second logic for storing in a second record in the computer a projected rate of inflation or deflation for the first period in a group of periods, said projected rate being related to the rate of inflation or deflation for the base period;

c. said computer program having third logic for storing in a third record in the computer amount rates corresponding to each said amount that will be applied to said amounts to achieve target amounts for each said period, said amount rates being related to said projected rate of inflation or deflation;

d. said computer program having fourth logic for converting said amount rates to factors by dividing each said amount rate by 100 and adding 1, and storing said converted amount rates into a fourth computer record;

e. said computer program having fifth logic for applying each said converted amount rate to its corresponding amount to achieve said target amounts for each said period, and storing said target amounts in a fifth computer record;

f. said computer program having sixth logic for storing in a sixth record in the computer an actual rate of inflation or deflation for the first of said periods and revised amount rates that are related to said actual rate;

g. said computer program having seventh logic for recalculating said target amounts for each said period based on said actual rate of inflation or deflation and said revised amount rates, and storing said recalculated target amounts in a seventh record in the computer;

h. said computer program having eighth logic for calculating variances between targeted amounts and actual amounts for any said period, and storing said variances in an eighth record in the computer;

i. said computer program having ninth logic for displaying said variances; and j. said computer program displaying new projected target amounts based on said actual amounts.

3. The program product recited by claim 2 wherein said actual amounts, said projected rate of inflation, said rates, said actual rates of inflation and deflation and said revised rates are input to the computer by the user through the computer input device.

4. The program product recited by claim 2 wherein said actual amounts, said projected rate of inflation, said rates, said actual rates of inflation and deflation and said revised rates are received by the computer from financial planning computer software.

5. The program product recited by claim 2 wherein said variances are provided by said program product to investment software.

6. A system for projecting targeted financial amounts, comprising:

a. a general purpose computer having electronic records and means for maintaining said records;

b. a display for displaying information;

c. an input device by which information may be received by said computer;

d. computer software, including:

first logic for storing in a first record in the computer actual amounts of gross income, income taxes, after-tax income, living costs and savings for a base period of time;

ii. second logic for storing in a second record in the computer a projected rate of inflation or deflation for the first period in a group of periods, said projected rate being related to the rate of inflation or deflation for the base period;

iii. third logic for storing in a third record in the computer amount rates corresponding to each said amount that will be applied to said amounts to achieve target amounts for each said period, said amount rates being related to said projected rate of inflation or deflation;

iv. fourth logic for converting said amount rates to factors by dividing each said amount rate by 100 and adding 1, and storing said converted amount rates into a fourth computer record;

v. fifth logic for applying each said converted amount rate to its corresponding amount to achieve said target amounts for each said period, and storing said target amounts in a fifth computer record;

vi. sixth logic for storing in a sixth record in the computer an actual rate of inflation or deflation for the first of said periods and revised amount rates that are related to said actual rate;

vii. seventh logic for recalculating said target amounts for each said period based on said actual rate of inflation or deflation and said revised amount rates, and storing said recalculated target amounts in a seventh record in the computer;

viii. eighth logic for calculating variances between targeted amounts and actual amounts for any said period, and storing said variances in an eighth record in the computer; and ix. ninth logic for displaying new projected target amounts based on said actual amounts.

7. The program product recited by claim 6 wherein said actual amounts, said projected rate of inflation, said rates, said actual rates of inflation and deflation and said revised rates are input to said computer by the user through said computer input device.

8. The program product recited by claim 6 wherein said actual amounts, said projected rate of inflation, said rates, said actual rates of inflation and deflation and said revised rates are received by said computer from financial planning computer software.

9. The product recited by claim 6 wherein said variances are provided by said system to investment software.

10. A computer read only memory for directing a financial operation on the computer, said computer read only memory having a computer program product, said computer program product including:

a first logic for storing in a first record in the computer actual amounts of gross income, income taxes, after-tax income, living costs and savings for a base period of time;

b. second logic for storing in a second record in the computer a projected rate of inflation or deflation for the first period in a group of periods, said projected rate being related to the rate of inflation or deflation for the base period;

c. third logic for storing in a third record in the computer amount rates corresponding to each said amount that will be applied to said amounts to achieve target amounts for each said period, said amount rates being related to said projected rate of inflation or deflation;

d. fourth logic for converting said amount rates to factors by dividing each said amount rate by 100 and adding 1, and storing said converted amount rates into a fourth computer record;

e. fifth logic for applying each said converted amount rate to its corresponding amount to achieve said target amounts for each said period, and storing said target amounts in a fifth computer record;

f. sixth logic for storing in a sixth record in the computer an actual rate of inflation or deflation for the first of said periods and revised amount rates that are related to said actual rate;

g. seventh logic for recalculating said target amounts for each said period based on said actual rate of inflation or deflation and said revised amount rates, and storing said recalculated target amounts in a seventh record in the computer;

h. eighth logic for calculating variances between targeted amounts and actual amounts for any said period, and storing said variances in an eighth record in the computer;

i. ninth logic for displaying said variances; and j. tenth logic for displaying new projected target amounts based on said actual amounts.

11. The program product recited by claim 10 wherein said actual amounts, said projected rate of inflation, said rates, said actual rates of inflation and deflation and said revised rates are input to the computer by the user through the computer input device.

12. The program product recited by claim 10 wherein said actual amounts, said projected rate of inflation, said rates, said actual rates of inflation and deflation and said revised rates are received by the computer from financial planning computer software.

13. The program product recited by claim 10 wherein said variances are provided by said program product to investment software.

* * * * *